United States Patent
Shake et al.

(10) Patent No.: US 7,684,697 B2
(45) Date of Patent: Mar. 23, 2010

(54) OPTICAL SIGNAL QUALITY MONITORING CIRCUIT AND OPTICAL SIGNAL QUALITY MONITORING METHOD

(75) Inventors: Ippei Shake, Kanagawa (JP); Hidehiko Takara, Kanagawa (JP); Atsushi Taniguchi, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 907 days.

(21) Appl. No.: 10/585,532

(22) PCT Filed: Jun. 3, 2005

(86) PCT No.: PCT/JP2005/010224
§ 371 (c)(1),
(2), (4) Date: Jul. 10, 2006

(87) PCT Pub. No.: WO2005/119943
PCT Pub. Date: Dec. 15, 2005

(65) Prior Publication Data
US 2008/0285970 A1    Nov. 20, 2008

(30) Foreign Application Priority Data
Jun. 3, 2004    (JP)    ............... 2004-166453

(51) Int. Cl.
*H04B 10/08* (2006.01)
(52) U.S. Cl. .............. 398/27; 398/25; 398/26
(58) Field of Classification Search ............ 398/25–27, 398/31–33
See application file for complete search history.

(56) References Cited

U.S. PATENT DOCUMENTS 6,836,620 B1 * 12/2004 Bischoff ................ 398/26

(Continued)

FOREIGN PATENT DOCUMENTS

EP    1 363 423 A2    11/2003

(Continued)

OTHER PUBLICATIONS

Office Action from Chinese Patent Office dated Mar. 6, 2009 for corresponding Chinese Application No. 2005-80002207.1 which relates to the same invention as the present application.

(Continued)

*Primary Examiner*—Dzung D Tran
(74) *Attorney, Agent, or Firm*—Workman Nydegger

(57) ABSTRACT

The present invention provides an optical signal quality monitoring circuit and an optical signal quality monitoring method for measuring correct optical signal quality parameters when a signal bit rate is changed. The optical signal quality monitoring circuit which samples and converts an electrical signal converted from an optical signal with a given repeated frequency $f_1$ to digital sampling data through an analog to digital conversion, thereafter, evaluates an optical signal quality parameter of the optical signal by subjecting sampling data to electrical signal processing in an integrated circuit in which a signal processing function is programmed, receives a control signal notifying that the bit rate of the optical signal is changed, or detects that the bit rate of the optical signal is changed to correct optical the signal quality parameter of the optical signal corresponding to the signal bit rate of the optical signal which is changed.

20 Claims, 33 Drawing Sheets

U.S. PATENT DOCUMENTS

| | | | |
|---|---|---|---|
| 2003/0011837 A1* | 1/2003 | Shake et al. | 359/110 |
| 2003/0117613 A1* | 6/2003 | Audouin et al. | 356/73.1 |
| 2004/0190899 A1* | 9/2004 | Torii et al. | 398/33 |
| 2007/0065162 A1* | 3/2007 | Kikuchi | 398/208 |

FOREIGN PATENT DOCUMENTS

| | | |
|---|---|---|
| JP | 06-076194 | 3/1994 |
| JP | 09-233030 | 9/1997 |
| JP | 10-240297 | 9/1998 |
| JP | 11-223575 | 8/1999 |
| JP | 2000-078084 | 3/2000 |
| JP | 2001-201401 | 7/2001 |
| JP | 2001-217775 | 8/2001 |
| JP | 2002-247117 | 8/2002 |
| JP | 2003-090766 | 3/2003 |
| JP | 2003-209522 | 7/2003 |
| JP | 2004-48688 | 2/2004 |

OTHER PUBLICATIONS

Ippei Shake et al., *Simple Q Factor Monitoring for BER Estimation Using Opened Eye Diagrams Captured by High-Speed Asynchronous Electrooptical Sampling*, IEEE Photonics Technology Letters, vol. 15, No. 4, Apr. 2003, pp. 620-622.

* cited by examiner

OPTICAL SIGNAL QUALITY MONITORING CIRCUIT AND OPTICAL SIGNAL QUALITY MONITORING METHOD

TECHNICAL FIELD

The present invention relates to an optical signal quality monitoring circuit and an optical signal quality monitoring method.

BACKGROUND ART

Optical signal quality monitoring devices employing asynchronous sampling have been known as those requiring no clock extraction.

In these optical signal quality monitoring devices employing asynchronous sampling, an evaluation was made for an intensity distribution of the optical signal on the basis of asynchronous eye patterns (refer to Patent Document 1, for example) or evaluation for the preponderant portion of the eye opening by measuring signal eye patterns with asynchronous sampling without using clock axes (refer to Patent Document 2, for example). In these optical signal quality monitoring devices employing asynchronous sampling, it is theoretically possible to provide an optical signal quality monitoring not according to a signal bit rate of the optical signal, because of adoption of asynchronous sampling.

Patent Document 1: Japanese Patent Application Laid-open No. 11-223575 (page 5 through 11, FIGS. 3, 6 and 19)

Patent Document 2: Japanese Patent Application Laid-open No. 2004-48688 (page 8 through 15, FIGS. 4 and 8)

DISCLOSURE OF THE INVENTION

However, in reality, a change in the signal bit rate of an optical signal results in variation in rise time and fall time in the optical signal pulse, difference in influence of ASE noise from a light amplifier superimposed on the optical signal or difference in influence of overshoot and undershoot generated in an electrical signal according to a light receiving band. Therefore, it is virtually impossible to apply to a plurality of signal bit rates only by the methods shown in conventional examples.

Further, in a conventional example, Q value is evaluated as an optical signal quality parameter, the calculation needs a complicated statistical processing, therefore, processing on software can be considered. However, the software processing has a problem that it is difficult to carry out a signal monitoring at a high speed due to restriction in the signal processing speed. Further, where signal processing on hardware is adopted, the circuit is anticipated to be larger in size from the complexity of the signal processing, which will impose problems such as size and cost of the device.

The present invention has been made in view of the above problems, and an object of the invention is to provide an optical signal quality monitoring circuit and an optical signal quality monitoring method capable of measuring correct optical signal quality parameters in response to variation in rise time and fall time in the optical signal pulse, difference in influence of ASE noise from a light amplifier superimposed on the optical signal or difference in influence of overshoot and undershoot generated in the electrical signal according to a light receiving band when the signal bit rate of the optical signal is changed. Another object of the present invention is to provide a high-speed optical signal quality monitoring circuit by using a signal processing algorithm suitable for hardware processing.

In order to attain the above objects, a first aspect of the present invention is an optical signal quality monitoring circuit comprising photoelectric conversion means for converting an input optical signal to an electrical signal, sampling means for sampling and converting the electrical signal with any given repetition frequency $f_1$ to digital sampling data by an analog to digital conversion and signal processing means for correcting and evaluating an optical signal quality parameter of the optical signal according to a change in the signal bit rate of the optical signal by using the sampling data.

A second aspect of the present invention is the optical signal quality monitoring circuit of the first aspect, which further comprises signal bit rate information receiving means for receiving signal bit rate information of the optical signal, wherein the signal processing means corrects the optical signal quality parameter of the optical signal on the basis of the received signal bit rate information.

A third aspect of the present invention is the optical signal quality monitoring circuit of the first aspect, which further comprising control signal receiving means for receiving a control signal demanding the switchover of signal bit rate of the optical signal, a plurality of frequency filters corresponding to individually different signal bit rates and a selector for changing a plurality of the frequency filters, wherein in response to receipt of the control signal, the signal processing means switches the selectors to measure the optical signal quality parameter of the optical signal, while sequentially changing frequency filters through which the electrical signal passes, fixes the selector so that the electrical signal can pass through the frequency filters in which the optical signal quality parameter is maximized after the electrical signal has passed through all the frequency filters, and evaluates the optical signal quality parameter of the optical signal.

A fourth aspect of the present invention is the optical signal quality monitoring circuit of the first aspect, wherein the signal processing means periodically changes a correction value of optical signal quality parameter corresponding to individually different signal bit rates and evaluates the optical signal quality parameter of the optical signal.

A fifth aspect of the present invention is the optical signal quality monitoring circuit of the first aspect which further comprises bit rate detection means for detecting a signal bit rate of the optical signal by using the electrical signal, wherein the signal processing means corrects the optical signal quality parameter of the optical signal on the basis of the detected signal bit rate.

A sixth aspect of the present invention is the optical signal quality monitoring circuit of the first aspect which further comprises a plurality of frequency filters corresponding to individually different signal bit rates and a selector for changing a plurality of the frequency filters, wherein the signal processing means periodically switches the selector to measure the optical signal quality parameter of the optical signal, while sequentially changing frequency filters through which the electrical signal passes and evaluates the optical signal quality parameter of the optical signal in which the optical signal quality parameter is maximized for each period.

A seventh aspect of the present invention is the optical signal quality monitoring circuit of the first aspect which further comprises bit rate detection means for detecting the signal bit rate of the optical signal by using the electrical signal, a plurality of frequency filters corresponding to individually different signal bit rates and a selector for changing a plurality of the frequency filters, wherein the signal processing means changes over the selector so that the electrical signal can pass through the frequency filters corresponding to the signal bit rates and evaluates the optical signal quality parameter of the optical signal.

An eighth aspect of the present invention is an optical signal quality monitoring circuit of either one of the first aspect through seventh aspects, wherein the photoelectric conversion means is provided with an optical electrical converter which converts an optical signal of repetition frequency $f_0$ to an electrical signal.

A ninth aspect of the present invention is the optical signal quality monitoring circuit of either one of the first aspect through seventh aspects, wherein the photoelectric conversion means is provided with an optical electrical sampling circuit which samples an optical signal of bit rate $f_0$ by using an electrical pulse synchronized with a clock of repetition frequency $f_1$ to output a sampling optical signal and an optical electrical converter for converting the sampling optical signal to an electrical signal.

A tenth aspect of the present invention is the optical signal quality monitoring circuit of either one of the first aspect through seventh aspects, wherein the photoelectric conversion means is provided with an optical-optical sampling circuit which samples an optical signal of bit rate $f_0$ by using an optical pulse synchronized with a clock of repetition frequency $f_1$ to convert the sampling optical signal and an optical electrical converter for converting the sampling optical signal to an electrical signal.

An eleventh aspect of the present invention is the optical signal quality monitoring circuit of either one of the first aspect through tenth aspects, wherein the signal processing means includes threshold processing means which compares a signal amplitude of the sampling data with a predetermined threshold to classify the sampling data into two distributions, namely, a mark part and a space part of a binary signal, summing processing means for calculating a sum of signal amplitude values of the sampling data and a sum of squares of the signal amplitude values for the respective two distributions, Q value calculation processing means in which a standard deviation and an average value are determined from a sum of signal amplitude values of the sampling data and a sum of squares of the amplitude values for the respective two distributions and a Q value is calculated by referring to the standard deviation and the average value of distribution of the mark part as well as the standard deviation and the average value of distribution of the space part, a Q value correction and processing means for correcting the Q value according to the signal bit rate of the optical signal, averaging processing means for measuring the corrected Q value multiple times and averaging the corrected Q value, Q value memory means for memorizing the Q value corrected and averaged, and alarm transfer means for transferring an alarm when the corrected and averaged Q value is lower than a reference Q value which is stored in advance.

A twelfth aspect of the present invention is the optical signal quality monitoring circuit of either one of the first aspect through tenth aspects, wherein the signal processing means comprising first threshold processing means which compares the signal amplitude of the sampling data with a first predetermined threshold to classify the sampling data into two distributions, namely, a mark part and a space part of the binary signal, summing processing means for calculating a sum of signal amplitude values of the sampling data for the respective two distributions, average value calculation processing means for determining the average value from a sum of signal amplitude values of the sampling data calculated for the respective two distributions, second threshold processing means for classifying, the average values determined respectively for the two distributions are respectively regarded as second and third thresholds, when the signal amplitude of the sampling data is greater than the second threshold, the sampling data into a distribution of the second mark part consisting of a distribution greater in signal amplitude than the second threshold and a distribution line-symmetrical to the second threshold, when the signal amplitude of the sampling data is smaller than the third threshold, for classifying the sampling data into a distribution of the second space part consisting of a distribution smaller in signal amplitude than the third threshold and a distribution line-symmetrical to the third threshold, second summing processing means for calculating a sum of squares of the signal amplitude of the sampling data for the respective two distributions of the second mark part and second space part, Q value calculation processing means in which a standard deviation is determined by using the sum of the signal amplitude values and the sum of squares of the signal amplitude for the respective two distributions of the second mark part and second space part, and a Q value is calculated by using the respective average values of the mark part and the space part as well as the respective standard deviations of the second mark part and the second space part, averaging processing means for measuring the corrected Q values multiple times and averaging the corrected Q values after the Q value is corrected according to the signal bit rates of the optical signal, Q value memory means for memorizing the corrected and averaged Q value, and alarm transfer means for transferring an alarm when the corrected and averaged Q value is lower than a reference Q value which is previously memorized.

A thirteenth aspect of the present invention is the optical signal quality monitoring circuit of any one of the first aspect through tenth aspects, wherein the signal processing means is comprised of histogram processing means in which the signal amplitude of the sampling data is classified for every quantization value and a histogram is obtained by summing the frequency, first threshold processing means for comparing the signal amplitude of the sampling data with a predetermined first threshold to classify the sampling data into two distributions, namely, a mark part and a space part of the binary signal, peak detection processing means in which a frequency peak is detected respectively for the two distributions of the mark part and the space part and a signal amplitude of the sampling data of which the frequency is the peak is set as an average value, second threshold processing means for classifying, the average values determined respectively for the two distributions are respectively regarded as second and third thresholds, when the signal amplitude of the sampling data is greater than the second threshold, the sampling data into a distribution of the second mark part consisting of a distribution greater in signal amplitude than the second threshold and a distribution line-symmetrical to the second threshold, when the signal amplitude of the sampling data is smaller than the third threshold, for classifying the sampling data into a distribution of the second space part consisting of a distribution smaller in signal amplitude than the third threshold and a distribution line-symmetrical to the third threshold, second summing processing means for calculating a sum of squares of the signal amplitude of the sampling data for the respective two distributions of the second mark part and second space part, Q value calculation processing means in which a standard deviation is determined by using the sum of the signal amplitude values and the sum of squares of the signal amplitude for the respective two distributions of the second mark part and second space part, and a Q value is calculated by using the respective average values of the mark part and the space part as well as the respective standard deviations of the second mark part and the second space part, Q value correction processing means for correcting the Q value according to the signal bit rate of the optical signal, averaging processing means for measuring the corrected Q values multiple times and averaging the corrected Q values, Q value memory means for memorizing the corrected and averaged Q value, and alarm transfer means for transferring an alarm when the corrected and averaged Q value is lower than a reference Q value which is previously memorized.

A fourteenth aspect of the present invention is the optical signal quality monitoring circuit of any one of the first aspect through tenth aspects, wherein the repetition frequency $f_1$ satisfies the formula of $f_1=(n/m)f_0 \pm a$ and $(n/m)^2/\{k+(n/m)\}f_0 \leq a < (n/m)^2/\{k+(n/m)-1\}f_0$ (n, m and k are natural numbers), and the signal processing means is comprised of processing means for detecting a preponderant portion of an eye opening of the eye pattern obtained by overwriting digital data for every k unit, Q value calculation processing means in which a frequency peak is detected for the respective distributions of the mark part and the space part around the part which is a maximum of the eye opening to determine the average value and the standard deviation from which the Q value is calculated, Q value correction processing means for correcting the Q value according to the signal bit rate of the optical signal, averaging processing means for measuring the corrected Q values multiple times and averaging the corrected Q values, Q value memory means for memorizing the corrected and averaged Q value, and alarm transfer means for transferring an alarm when the corrected and averaged Q value is lower than a reference Q value which is previously memorized.

A fifteenth aspect of the present invention is an optical signal quality monitoring method comprising a step of converting an input optical signal to an electrical signal, a step of sampling the electrical signal with any given repetition frequency $f_1$ and converting the electrical signal into digital sampling data with an analog to digital conversion and a step of evaluating an optical signal quality parameter of the optical signal according to changes in the signal bit rate of the optical signal by using the sampling data.

A sixteenth aspect of the present invention is the optical signal quality monitoring method of the fifteenth aspect, wherein the step of evaluating optical signal quality parameters of the optical signal comprises a step is comprised of a step which compares the signal amplitude of the sampling data with a predetermined threshold to classify the sampling data into two distributions, namely, a mark part and a space part of the binary signal, a step of calculating a sum of signal amplitude values of the sampling data and a sum of squares of the signal amplitude value respectively for the two distributions, a step in which a standard deviation and an average value are determined from a sum of signal amplitude values of the sampling data and a sum of squares of the amplitude value for the respective two distributions, and a Q value is calculated by using the standard deviation and the average value of the distribution of the mark part as well as the standard deviation and the average value of the distribution of the space part, a step of correcting the Q value according to the signal bit rate of the optical signal, a step of measuring the corrected Q value multiple times and averaging the corrected Q value, a step of comparing the corrected and averaged Q value with a reference Q value which is previously memorized, and a step of transferring an alarm when the corrected and averaged Q value is lower than a reference Q value which is previously memorized.

A seventeenth aspect of the present invention is the optical signal quality monitoring method of the fifteenth aspect, wherein the step of evaluating optical signal quality parameters of the optical signal comprises a step which compares the signal amplitude of the sampling data with a predetermined first threshold to classify the sampling data into two distributions, namely, a mark part and a space part of the binary signal, a step of calculating a sum of signal amplitude values of the sampling data for the respective two distributions, a step of calculating an average value from a sum of signal amplitude values of the sampling data calculated for the respective two distributions, a step for classifying, the average values determined respectively for the two distributions are respectively regarded as second and third thresholds, when the signal amplitude of the sampling data is greater than the second threshold, these thresholds into a distribution of the second mark part consisting of a distribution greater in signal amplitude than the second threshold and a distribution line-symmetrical to the second threshold, when the signal amplitude of the sampling data is smaller than the third threshold, for classifying the sampling data into a distribution of the second space part consisting of a distribution smaller in signal amplitude than the third threshold and a distribution line-symmetrical to the third threshold, a step of calculating a sum of squares of the signal amplitude of the sampling data respectively for the two distributions of the second mark part and second space part, a step in which a standard deviation is determined from a sum of the signal amplitude values and a sum of squares of the signal amplitude for the respective two distributions of the second mark part and second space part, and a Q value is calculated by using the respective average values of the mark part and the space part as well as the respective standard deviations of the second mark part and the second space part, a step of measuring the corrected Q values multiple times and averaging the corrected Q values after the Q value is corrected according to the signal bit rate of the optical signal, a step of memorizing the corrected and averaged Q value, and a step of transferring an alarm when the corrected and averaged Q value is lower than a reference Q value which is previously memorized.

An eighteenth aspect of the present invention is the optical signal quality monitoring method of the fifteenth aspect, wherein the step of evaluating optical signal quality parameters of the optical signal is comprised of a step in which the signal amplitude of the sampling data is classified for every quantization value and a histogram is obtained by adding the frequency, a step of comparing the signal amplitude of the sampling data with a predetermined first threshold to classify the sampling data into two distributions, namely, a mark part and a space part of the binary signal, a step in which a frequency peak is detected respectively for the two distributions of the mark part and the space part and a signal amplitude of the sampling data showing the peak frequency is established as an average value, a step for classifying, the average values determined respectively for the two distributions are respectively regarded as second and third thresholds, when the signal amplitude of the sampling data is greater than the second threshold, these thresholds into a distribution of the second mark part consisting of a distribution greater in signal amplitude than the second threshold and a distribution line-symmetrical to the second threshold, when the signal amplitude of the sampling data is smaller than the third threshold, for classifying the sampling data into a distribution of the second space part consisting of a distribution smaller in signal amplitude than the third threshold and a distribution line-symmetrical to the third threshold, a step of calculating a sum of squares of the signal amplitude of the sampling data for the respective two distributions of the second mark part and second space part, a step in which a standard deviation is determined by using a sum of the signal amplitude values and a sum of squares of the signal amplitude for the respective two distributions of the second mark part and second space part, and a Q value is calculated by using the respective average values of the mark part and space part as well as the respective standard deviations of the second mark part and second space part, a step of correcting the Q value according to the signal bit rate of the optical signal, a step of measuring the corrected Q values multiple times and averaging the corrected Q values, a step of memorizing the corrected and averaged Q value, and a step of transferring an alarm when the corrected and averaged Q value is lower than a reference Q value which is previously memorized.

A nineteenth aspect of the present invention is the optical signal quality monitoring method of the fifteenth aspect, wherein the step of converting an electrical signal to digital sampling data through an analog to digital conversion samples the electrical signal by a repetition frequency $f_1$ which satisfies $f_1=(n/m)f_0 \pm a$ and $(n/m)^2/\{k+(n/m)\}f_0 \leq a < (n/m)^2/\{k+(n/m)-1\}f_0$ (n, m and k are natural numbers), and the step of evaluating optical signal quality parameters of the optical signal comprising a step of detecting a preponderant portion of an eye opening of the eye pattern obtained by overwriting digital data for every k unit, a step in which a frequency peak is detected for the respective distributions of the mark part and space part around the part which is a maximum of the eye opening to determine the average value and the standard deviation, from which the Q value is calculated, a step of correcting the Q value according to the signal bit rate of the optical signal, a step of measuring the corrected Q values multiple times and averaging the corrected Q value, a step of memorizing the corrected and averaged Q value, and a step of transferring an alarm when the corrected and averaged Q value is lower than a reference Q value which is previously memorized.

As described above, since the present invention does not require a clock extraction part, a device can be made smaller in size, simpler in methods and structure and lower in cost. The present invention provides an optical signal quality monitoring circuit and an optical signal quality monitoring method, which can appropriately correct a signal quality parameter corresponding to a change in the signal bit rate by appropriately applying correction factors, with consideration given to variation in rise time and fall time in the optical signal pulse, difference in influence of ASE noise from a light amplifier superimposed on the optical signal or difference in influence of overshoot and undershoot generated in the electrical signal according to a light receiving band. Further, the present invention also provides an optical signal quality monitoring circuit and an optical signal quality monitoring method in which a structure so as to change over electrical filters multiple times is adopted thereby suppressing variations in rise time and fall time in the optical signal pulse, a difference in influence of ASE noise from a light amplifier superimposed on the optical signal and difference in influence of overshoot and undershoot generated in the electrical signal according to a light receiving band to measure accurately optical signal quality parameters even when the bit rate changes by adopting.

In addition, the present invention provides an optical signal quality monitoring circuit that enables a signal quality parameter calculation with hardware by combination with a signal threshold process based on a predetermined threshold, an summing process, a histogram process and data storing actions in memory

BRIEF DESCRIPTION OF THE DRAWINGS

FIG. 13 is applied.

FIG. 13 is a flowchart showing another embodiment of the signal processing algorithm in the optical signal quality monitoring circuit of the present invention.

DESCRIPTION OF SYMBOLS

100: optical signal quality monitoring circuit
102: register
104: optical electrical converter (O/E)
106: local clock source 1
108: sampling and analog to digital converter (ADC & sampler)
112: integrated circuit

BEST MODE FOR CARRYING OUT THE INVENTION

Hereinafter, a detailed explanation will be made for embodiments of the present invention with reference to the drawings.

Embodiment 1

Figure 1:
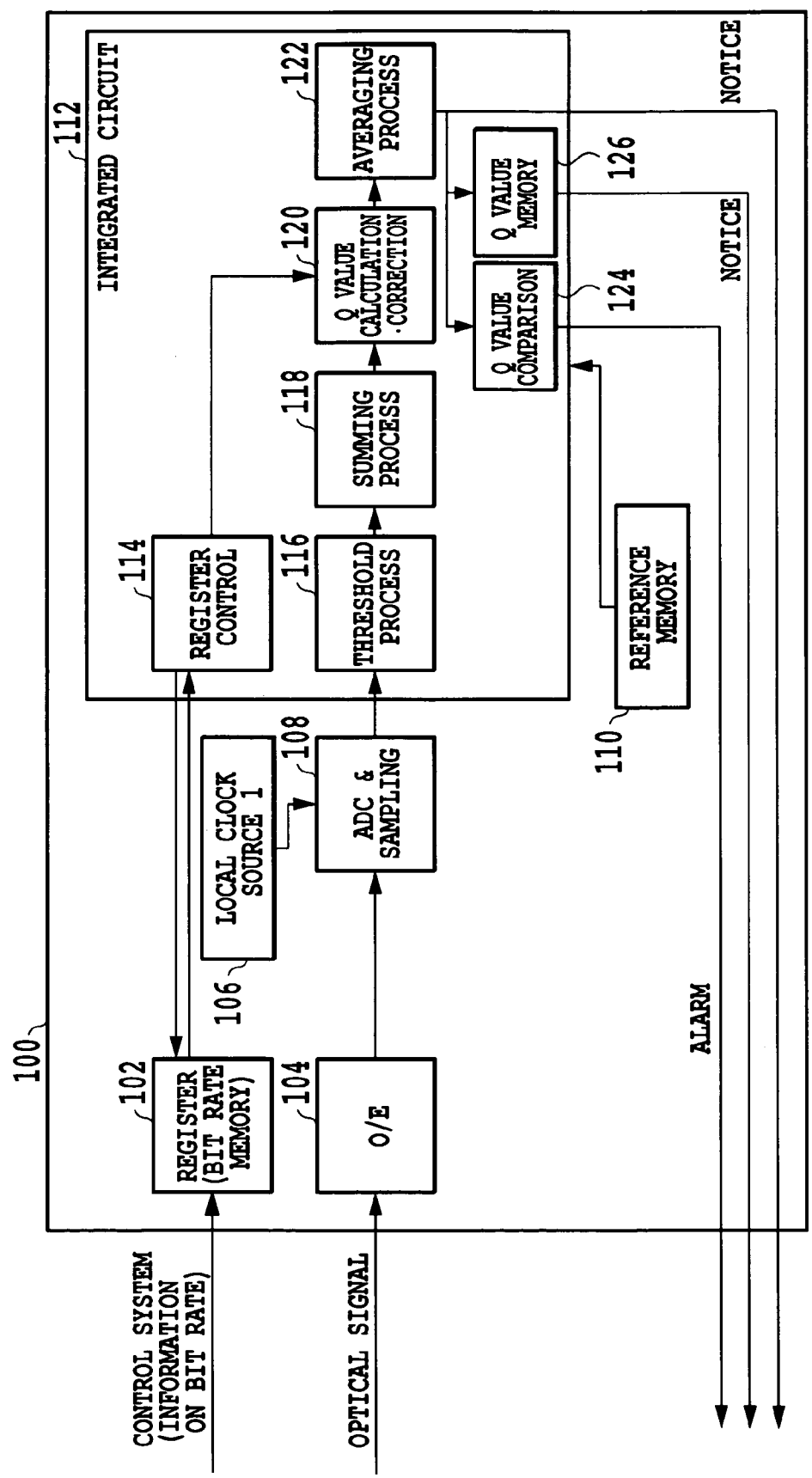
FIG. 1 is a block diagram showing an embodiment of the optical signal quality monitoring circuit of the present invention.

FIG. 1 is a block diagram showing an embodiment of the optical signal quality monitoring circuit of the present invention.

An optical signal quality monitoring circuit 100 is provided with an optical electrical converter (O/E) 104 which subjects an input optical signal of optical signal bit rate $f_0$ (bit/s) to a photoelectric conversion, thereby outputting an electrical signal, a local clock source 1 (106) for generating and outputting a sampling clock of the repetition frequency $f_1$ (Hz) independent of optical signal bit rate $f_0$, a sampling and analog to digital converter (hereinafter referred to as ADC & sampler) 108 for sampling the electrical signal output from the optical electrical converter 104 by using a sampling clock of the frequency $f_1$ (Hz) and subjecting it to the analog to digital conversion, thereby outputting digital sampling data, an integrated circuit 112 for subjecting the sampling data output from the ADC & sampler 108 to the signal processing to evaluate an optical signal quality parameter, and a register 102 for receiving and memorizing a control signal which notifies that the optical signal bit rate $f_0$ is changed.

An optical signal of the optical signal bit rate $f_0$ (bit/s) is converted to an electrical signal by the optical electrical converter 104 and then input into the ADC & sampler 108. Then, the electrical signal is sampled and subjected to the analog to digital conversion by the clock of the repetition frequency $f_1$ (Hz) independent of the optical signal bit rate $f_0$ sent from the local clock source 1 (106) in the ADC & sampler 108, converted to digital sampling data, and thereafter, input into an integrated circuit 112. The integrated circuit is an LSI having a memory and CPU such as FPGA (Field Programmable Gate Array), for example. The sampling data are subjected to electrical signal processing in the integrated circuit 112 in which the signal processing function is programmed and used for evaluating an optical signal quality parameter.

When the optical signal bit rate $f_0$ is changed, the register 102 receives a control signal (for example, bit rate information) notifying the change in the bit rate sent from the control system of a optical transmission system in which the optical signal quality monitoring circuit of the present invention is implemented. The integrated circuit 112 reads the control signal from the register 102 and corrects a signal quality parameter corresponding to the changed optical signal bit rate $f_0$, when the optical signal bit rate $f_0$ is changed. By this means, it enables to remove variation in rise time and fall time in the optical signal pulse, difference in influence of ASE noise from a light amplifier superimposed on the optical signal or difference in influence of overshoot and undershoot generated in the electrical signal according to a light receiving band due to a change in the bit rate.

The integrated circuit 112 conducts the signal processing by using an algorithm shown in any of FIG. 3, FIG. 6, FIG. 9, FIG. 12 or FIG. 13. Each algorithm is described in Embodiment 3 to Embodiment 7. The integrated circuit 112 of the optical signal quality monitoring circuit shown in FIG. 1 shows a case where the signal processing is conducted by using the algorithm shown in FIG. 3.

In the above description, a case is described in which the control signal notifying a change in the bit rate is received and memorized by the register 102. Such a case may also be acceptable that the control signal is received by the integrated circuit 112.

Embodiment 2

Figure 2:
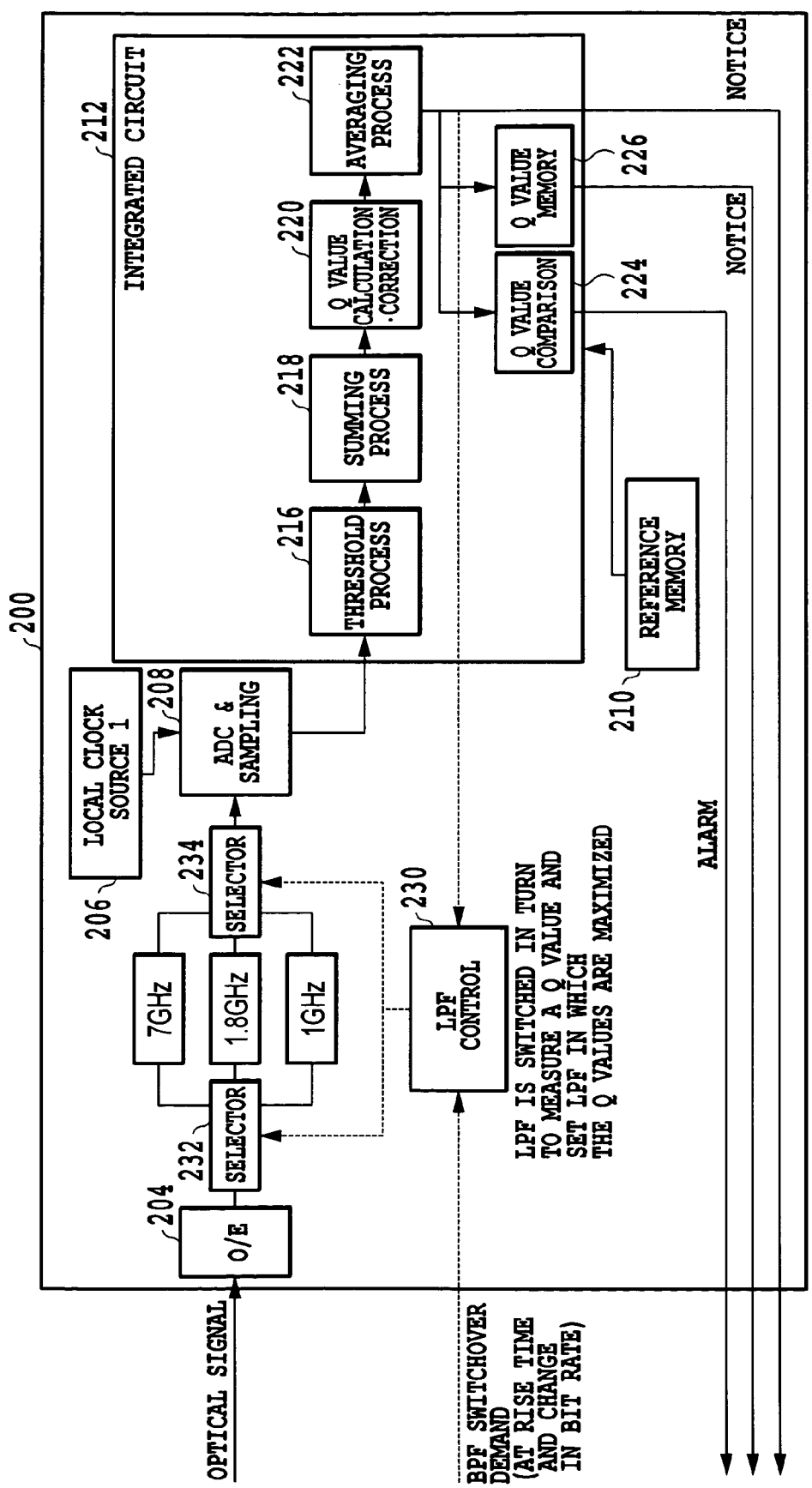
FIG. 2 is a block diagram showing another embodiment of the optical signal quality monitoring circuit of the present invention.

FIG. 2 is a block diagram showing another embodiment of the optical signal quality monitoring circuit in the present invention.

An optical signal quality monitoring circuit 200 is provided with an optical electrical converter (O/E) 204 for subjecting the input optical signal of the optical signal bit rate $f_0$ (bit/s) to the photoelectric conversion, thereby outputting an electrical signal, a local clock source 1 (206) for generating and outputting the sampling clock of the repetition frequency $f_1$ (Hz) independent of the optical signal bit rate $f_0$, a plurality of frequency filters corresponding to individually different signal bit rates $f_0$ (for example, 7 GHz, 1.8 GHz and 1 GHz), selectors 232 and 234 for changing a plurality of the frequency filters, an ADC & sampler 208 for sampling the filter-passed electrical signal by using the sampling clock of the frequency $f_1$ (Hz) and outputting the digital sampling data subjected to the analog to digital conversion, an integrated circuit 212 for subjecting the sampling data output from the ADC & sampler 208 to the signal processing and evaluating an optical signal quality parameter, and an LPF control part for receiving a control signal notifying that the optical signal bit rate $f_0$ is changed or a switchover signal of the filter from the integrated circuit 212 and controlling the selectors.

An optical signal of the optical signal bit rate $f_0$ (bit/s) is converted to an electrical signal by the optical electrical converter 204 and then input into any of a plurality of frequency filters corresponding to individually different optical signal bit rates $f_0$ switched by the selectors 232 and 234. The filter-passed electrical signal is converted to sampling data by the ADC & sampler 208, as described in Embodiment 1 and thereafter used in evaluating optical signal quality parameters in the integrated circuit 212.

When the optical signal bit rate $f_0$ is changed, the optical signal quality monitoring circuit 200 receives, for example, a control signal demanding switchover of the signal bit rate which is sent from a control system of the optical transmission system in which the optical signal quality monitoring circuit 200 of the present invention is implemented and measures signal quality parameters while switching the selectors 232 and 234 to sequentially change frequency filters through which the electrical signal passes. The control signal can be made so as to be received, for example, by an LPF control 230 which controls the selectors 232 and 234. The integrated circuit measures signal quality parameters of the electrical signal which has passed through the frequency filters sequentially switched. After the electrical signal passes through all the frequency filters, the integrated circuit fixes the selectors 232 and 234 so that the signal can pass through the frequency filter maximizing the signal quality parameter, thereby accommodating to a change in the signal bit rate. It is, therefore, possible to remove variation in rise time and fall time in the optical signal pulse, difference in influence of ASE noise from a light amplifier superimposed on the optical signal or difference in influence of overshoot and undershoot generated in the electrical signal according to a light receiving band due to a change in the bit rate.

The integrated circuit 212 conducts the signal processing by using an algorithm shown in any of FIG. 3, FIG. 6, FIG. 9, FIG. 12 or FIG. 13. Each algorithm is described in Embodiment 3 to Embodiment 7. The integrated circuit 212 of the optical signal quality monitoring circuit shown in FIG. 2 shows a case where the signal processing is conducted by using the algorithm shown in FIG. 3.

Embodiment 3

Figure 3:
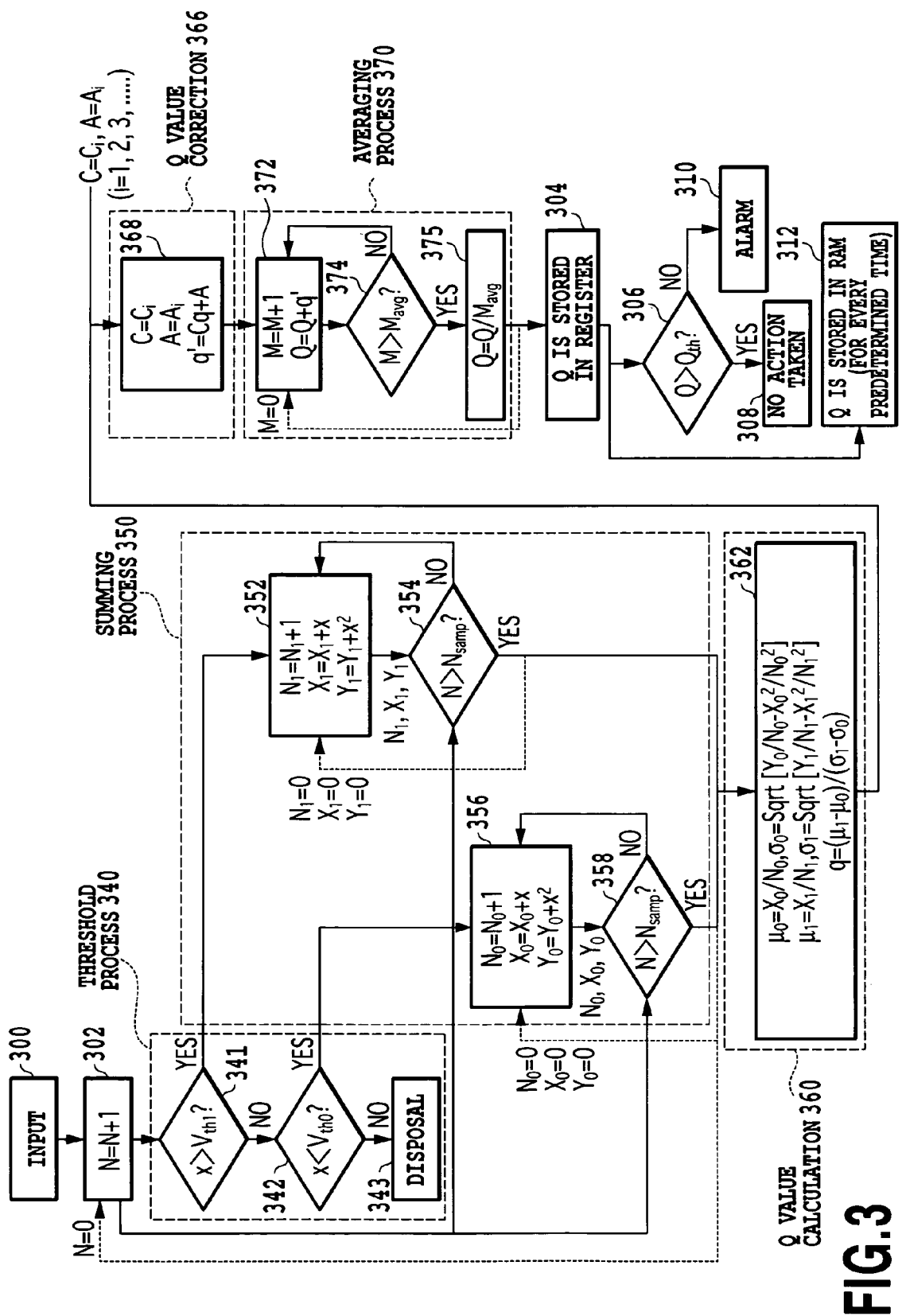
FIG. 3 is a flowchart showing an embodiment of the signal processing algorithm in the optical signal quality monitoring circuit of the present invention.

FIG. 3 is a flowchart showing an embodiment of the signal processing algorithm in the optical signal quality monitoring circuit of the present invention. The voltage value x of sampling data output from the ADC & sampler 108 (FIG. 1) or 208 (FIG. 2) and input into the integrated circuit 112 (FIG. 1) or 212 (FIG. 2), in the threshold process 340, is classified as a mark level distribution when the voltage value is greater than the threshold $Vth_1$ (341), it is classified as a space level distribution when it is smaller than the $Vth_0$ (342), and it is discarded when it does not fall under either of the above cases (343).

Figure 28:
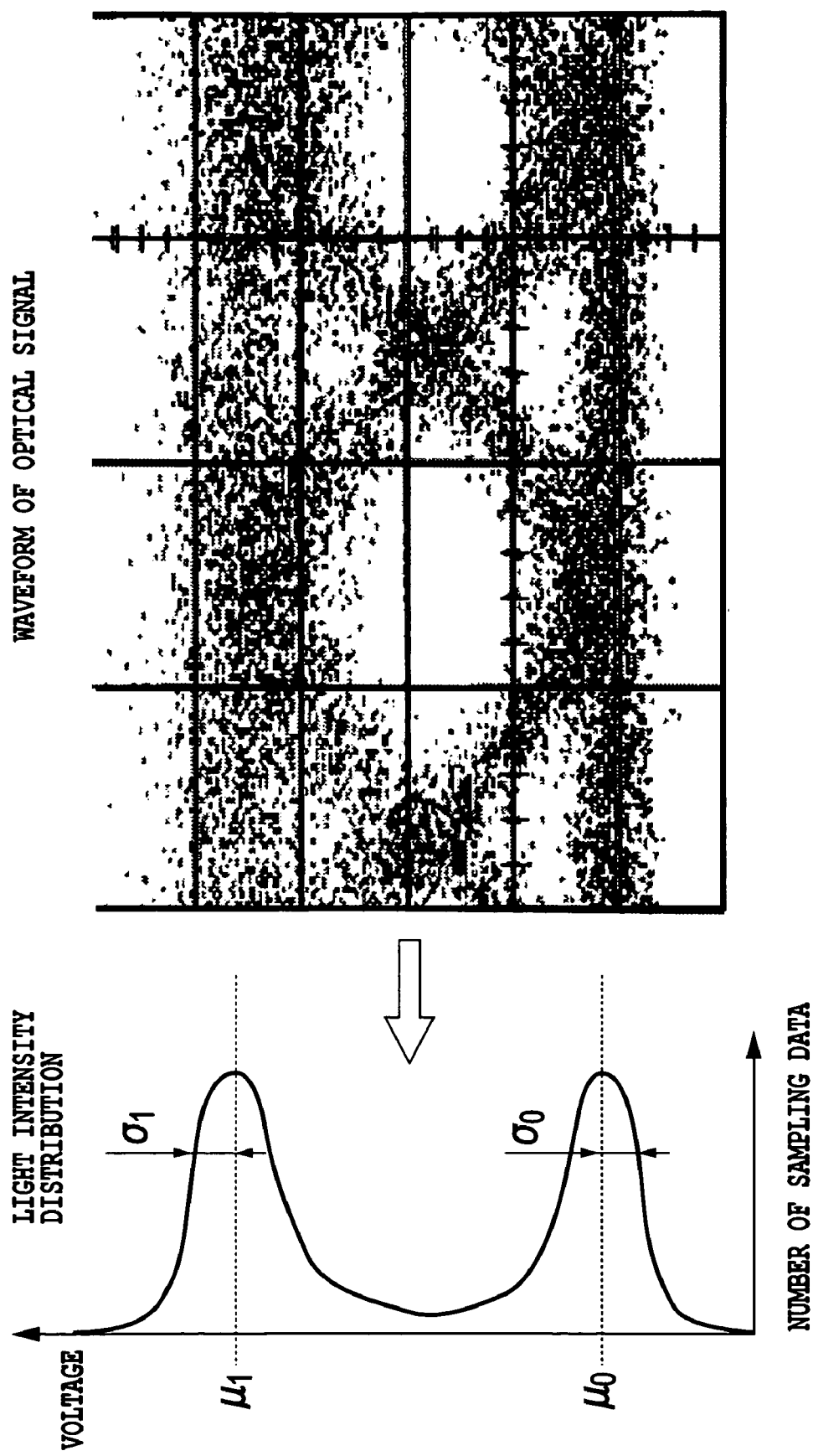
FIG. 28 is a diagram showing the relationship between the optical signal waveform input to the optical signal quality monitoring circuit of the present invention and the voltage value distribution of sampling data of the optical signal.

FIG. 28 shows the relationship between the optical signal waveform input to the ADC & sampler 108 (FIG. 1) and 208 (FIG. 2) and the distribution of voltage value x of sampling data output from the ADC & sampler 108 (FIG. 1) and 208 (FIG. 2).

Figure 29:
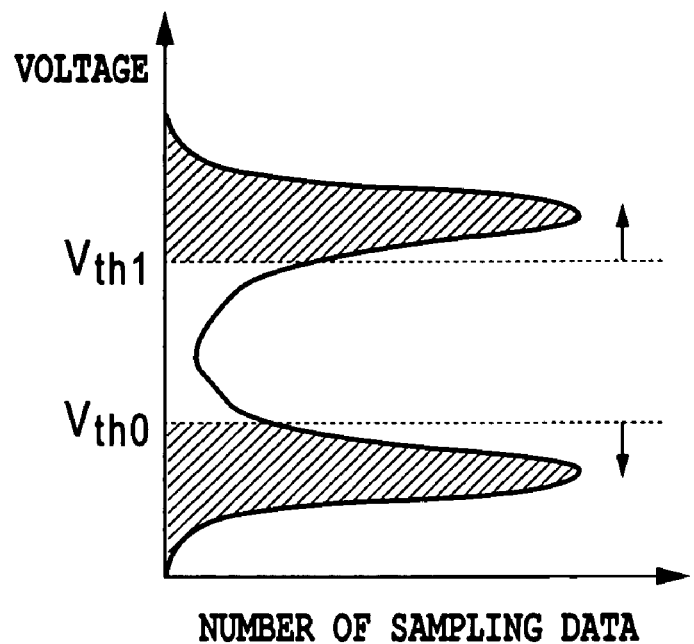
FIG. 29 is a diagram showing the signal processing in the optical signal quality monitoring circuit of the present invention.

As shown in FIG. 29, in a threshold process 340, the voltage value x of sampling data is classified as a mark level distribution or a space level distribution based on two threshold values of $Vth_1$ and $Vth_0$.

Then, in an addition process 350, a voltage value of sampling data and its square are summed respectively to the mark level distribution and the space level distribution (352 and 356). On the assumption that the number of sampling data necessary for measurement is Nsamp, the above process is repeated until the number of sampling signals to be input reaches Nsamp.

When the number of sampling signals reaches Nsamp, in a Q value calculation 360, the Q value (q) is calculated on the basis of the following formula by referring to sums of voltage values of the sampling signal ($X_0$, $X_1$), sums of voltage squares of the sampling signal ($Y_0$, $Y_1$) and numbers of distribution points ($N_0$, $N_1$) in the mark level and the space level. In the formula, $\mu_0$ and $\mu_1$ are averages and $s_0$ and $s_1$ are standard deviations.

Figure 30:
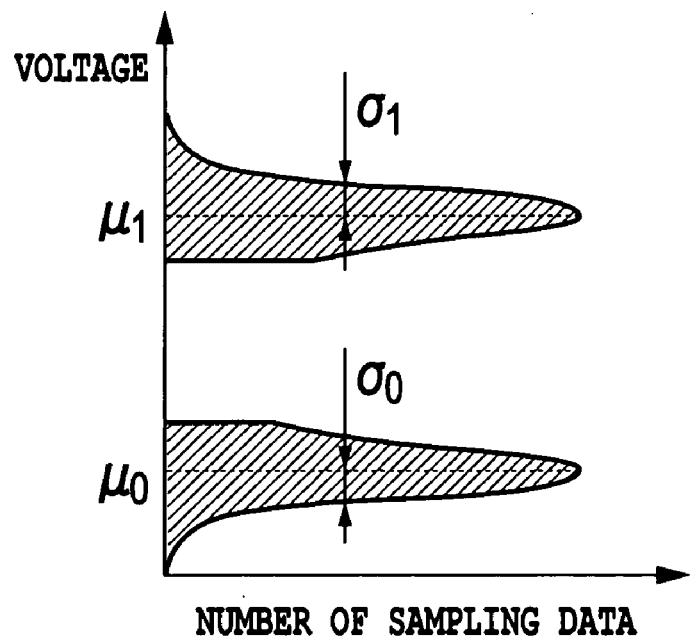
FIG. 30 is a diagram showing the signal processing in the optical signal quality monitoring circuit of the present invention.

As shown in FIG. 30, in the summing process 350, the averages $\mu_0$ and $\mu_1$ as well as the standard deviations $s_0$ and $s_1$ are determined respectively for the mark level distribution and the space level distribution.

$$\mu_0 = \frac{X_0}{N_0}, \sigma_0 = Sqrt\left[\frac{Y_0}{N_0} - \frac{X_0^2}{N_0^2}\right]$$

$$\mu_1 = \frac{X_1}{N_1}, \sigma_1 = Sqrt\left[\frac{Y_1}{N_1} - \frac{X_1^2}{N_1^2}\right]$$

$$q = \frac{\mu_1 - \mu_0}{\sigma_1 - \sigma_0}$$

[Formula 1]

Since the Q value (q) obtained by the Q value calculation 360 is an average Q value, it is necessary to correct the average Q value to be convertible to a bit error rate. In the Q value correction 366, correction factors C and A are corrected by using values corresponding to individual optical signal bit rates (for example, Ethernet (registered trademark), 10 G Ethernet (registered trademark), FEC-encoded bit rate, SDH signal and OTN signal). In this instance, the correction factors C and A are obtained in advance by measuring an average Q value for optical signals whose bit error rate is known using the optical signal quality monitoring circuit of the present invention.

In the averaging process 370, the Q value measurement is repeated the number of Mavg times (374) to obtain an average (375), by which a Q value representing the signal quality of the optical signal is finally obtained.

The obtained Q value is compared with a predetermined Qth that is a Q value predetermined as a signal deterioration threshold (306). When the obtained Q value is lower than the Qth, an alarm is issued (310).

At the same time, a continuously measured Q value is stored in RAM for every predetermined time (312) and a function is provided so as to refer to the Q value retrospectively.

A function is also provided, which notifies the Q value measured continuously and the Q value stored in RAM.

Integrated circuits 112 and 212 in the optical signal quality monitoring circuit of the present invention shown in FIG. 1 and FIG. 2 show a case where the signal processing is conducted by using the algorithm of the present embodiment.

Embodiment 4

Figure 4:
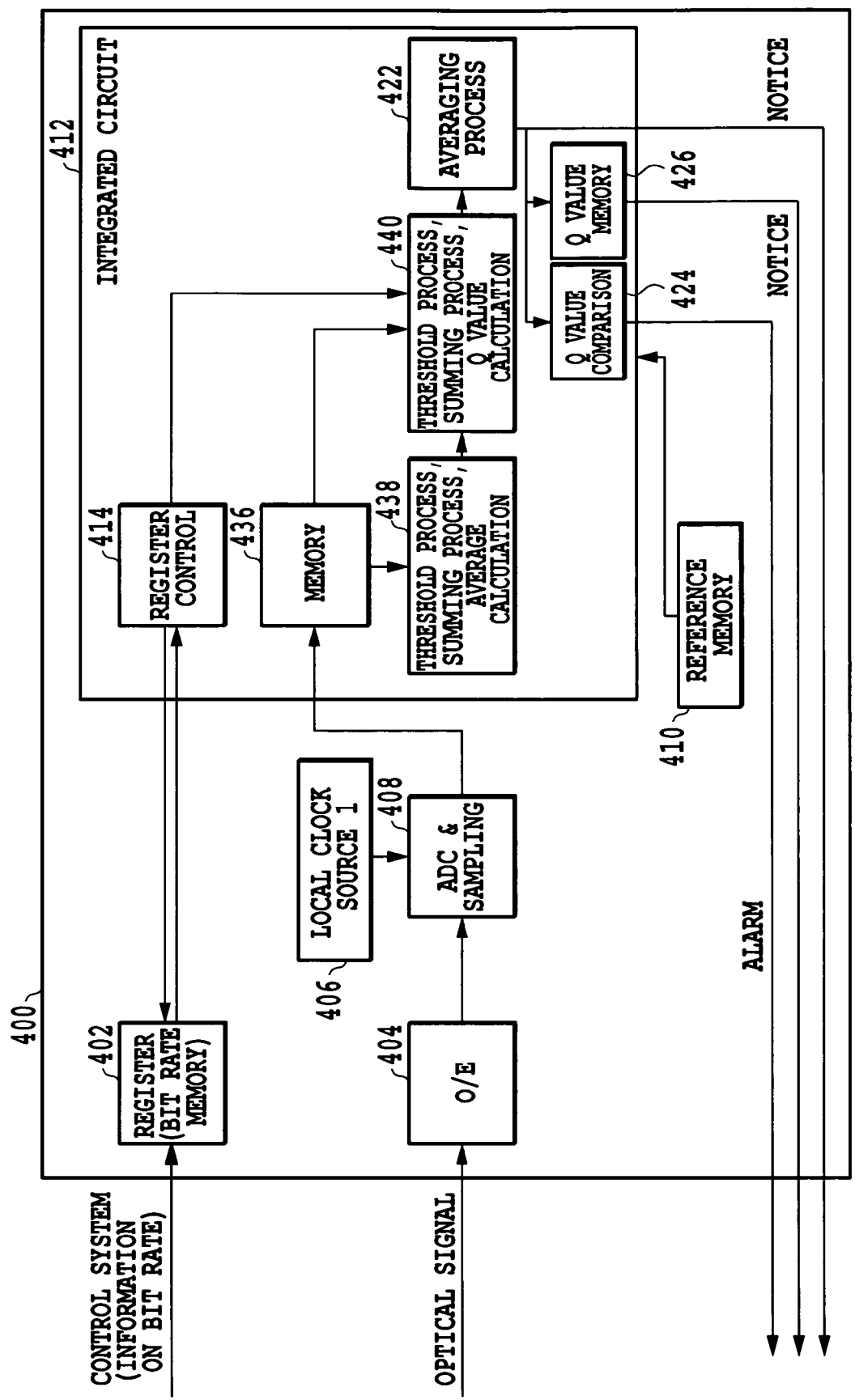
FIG. 4 is a block diagram showing the optical signal quality monitoring circuit shown in FIG. 1 to which an embodiment of the signal processing algorithm shown in FIG. 6 is applied.
Figure 5:
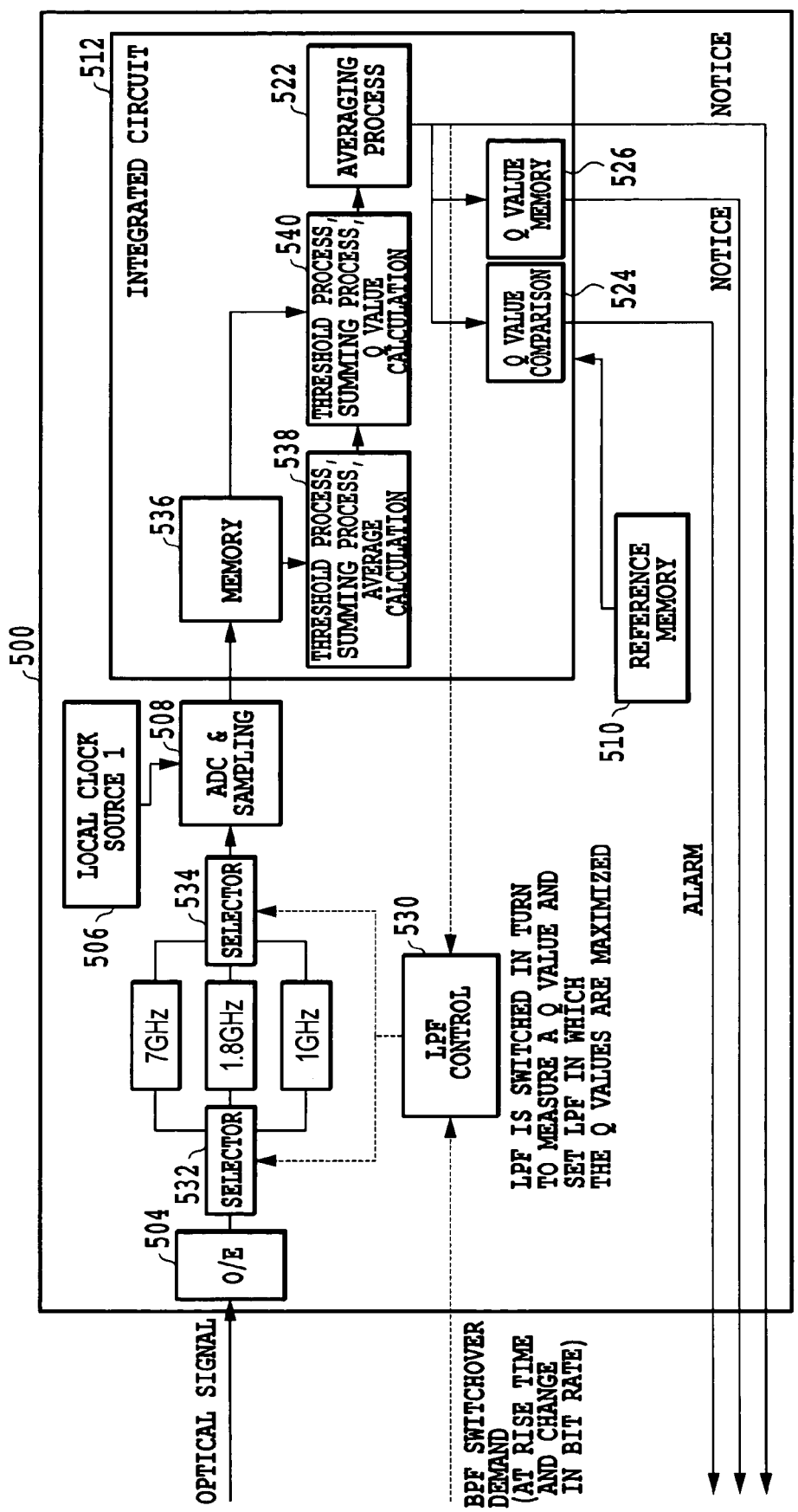
FIG. 5 is a block diagram showing the optical signal quality monitoring circuit shown in FIG. 2 to which an embodiment of the signal processing algorithm shown in FIG. 6 is applied.
Figure 6:
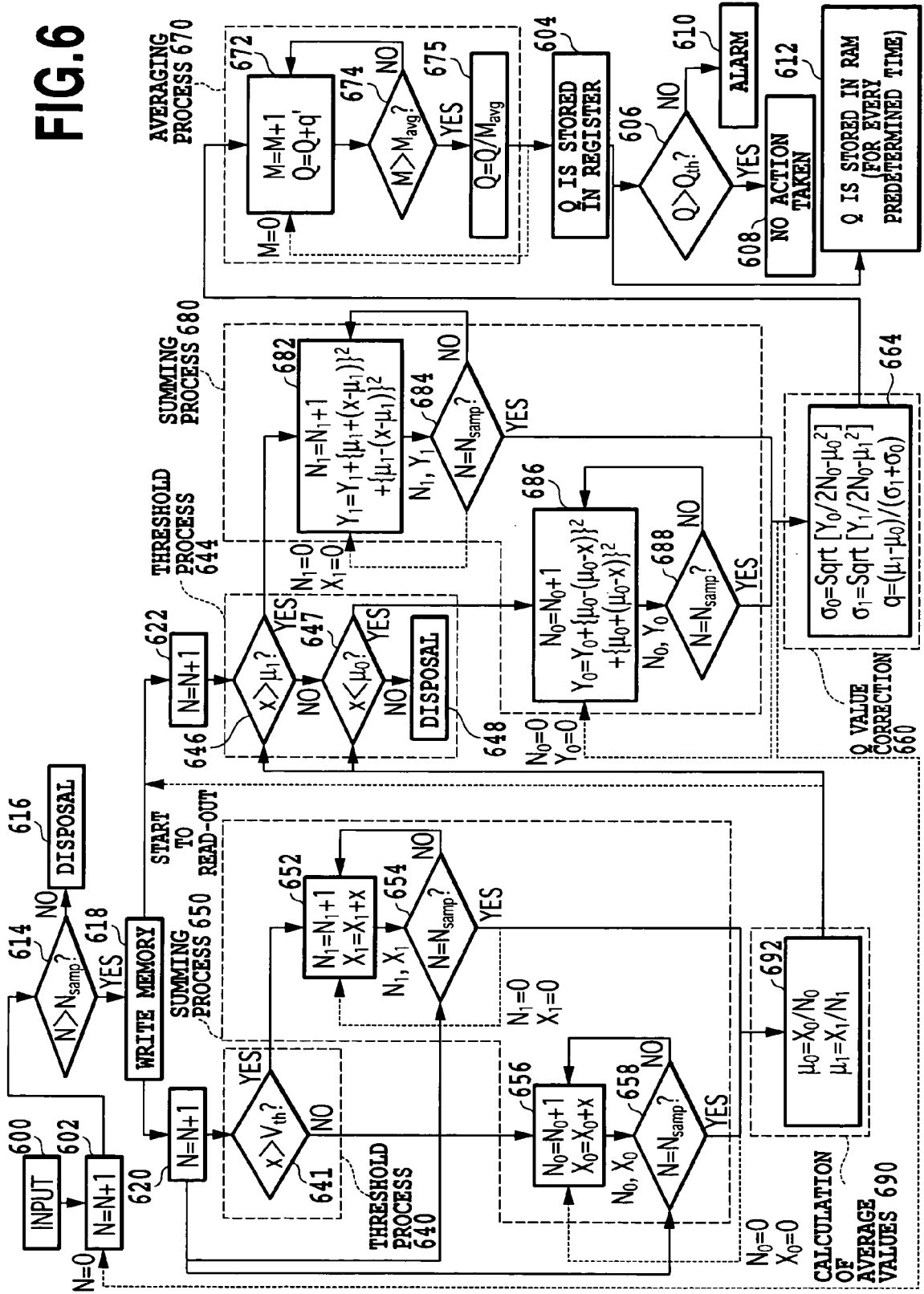
FIG. 6 is a flowchart showing another embodiment of the signal processing algorithm in the optical signal quality monitoring circuit of the present invention.

FIG. 6 is a flowchart showing another embodiment of the signal processing algorithm in the optical signal quality monitoring circuit of the present invention. The optical signal quality monitoring circuits in FIG. 4 and FIG. 5 correspond respectively to the optical signal quality monitoring circuits shown in FIG. 1 and FIG. 2, showing a case where the integrated circuits 412 and 512 conduct the signal processing by using the algorithm of the present embodiment.

The voltage value x of sampling data output from the ADC & samplers 408 (FIG. 4) and 508 (FIG. 5) and input into the programmable integrated circuits 412 (FIG. 4) and 512 (FIG. 5) is stored in memories (436 (FIG. 4) and 536 (FIG. 5)) until the number of sampling data reaches Nsamp which is a number necessary for measurement (614, 616 and 618).

The voltage value x of sampling data read out from the memories is compared with the threshold Vth (641), and the sampling data whose voltage value x is greater than the threshold Vth are classified as a mark level distribution, whereas the sampling data whose voltage value x is smaller than the threshold Vth are classified as a space level distribution (threshold process 640).

Figure 31:
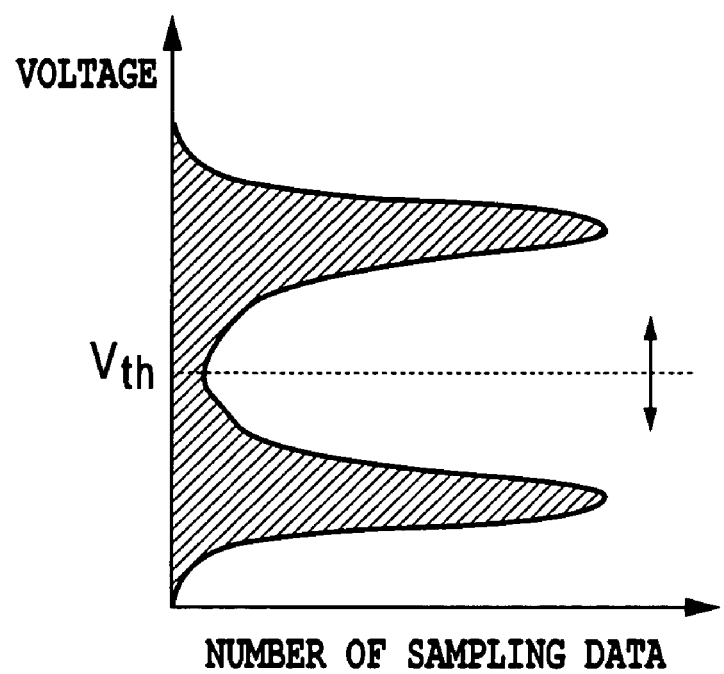
FIG. 31 is a diagram showing the signal processing in the optical signal quality monitoring circuit of the present invention.

As shown in FIG. 31, in the threshold process 640, the voltage value x of sampling data is classified as the mark level distribution and the space level distribution on the basis of the threshold Vth.

Summing processes (652, 656) are conducted for the voltage value of a sampling signal in the respective distributions. The process of summing is repeated until all the data stored in the memories (Nsamp) are read out (654, 658) (summing process 650).

In the average value calculation 690, when all the data are read out, voltage average values ($\mu_0$, $\mu_1$) of sampling signals of the respective mark and space level distribution are calculated on the basis of sums ($X_0$, $X_1$) of the voltage value of the sampling signal and numbers of distribution points ($N_0$, $N_1$) for the mark level distribution and the space level distribution.

Figure 32:
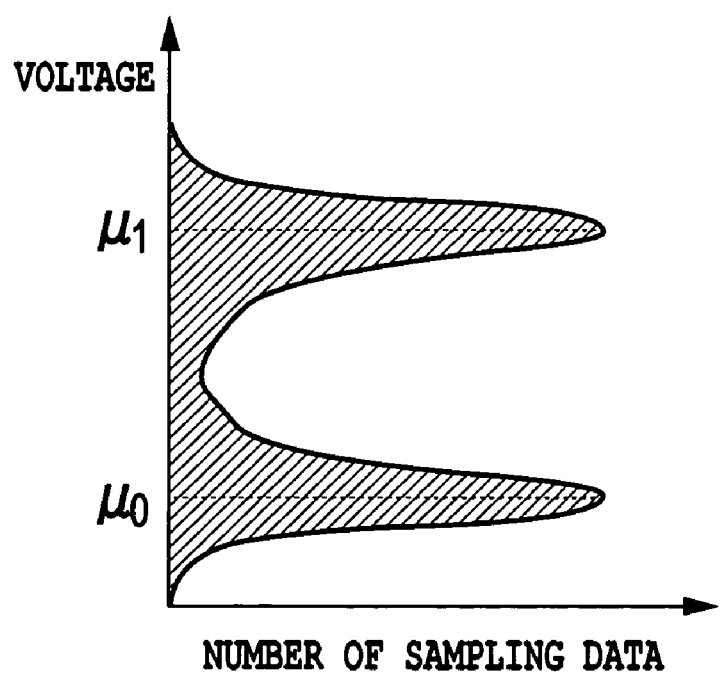
FIG. 32 is a diagram showing the signal processing in the optical signal quality monitoring circuit of the present invention.

As shown in FIG. 32, in the average value calculation 690, the averages, $\mu_0$ and $\mu_1$ are determined respectively for the mark level distribution and the space level distribution.

The average values ($\mu_0$, $\mu_1$) obtained in the average value calculation 690 are respectively set to thresholds $Vth_1$ and $Vth_0$. The voltages of the sampling signal stored in the memories are read out again, and then are compared with $Vth_1$ and $Vth_0$ to be classified as the mark level when greater than $Vth_1$, and as the space level when smaller than $Vth_0$ (threshold process 644).

Figure 33:
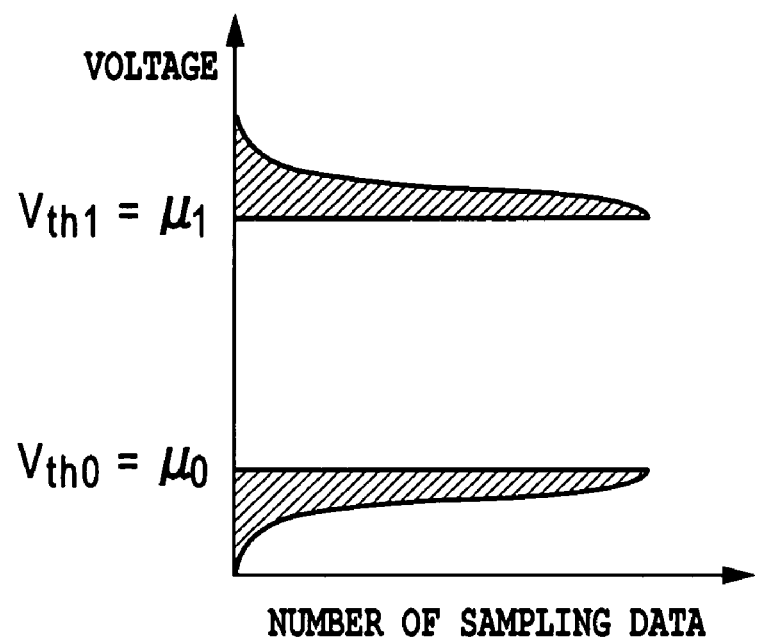
FIG. 33 is a diagram showing the signal processing in the optical signal quality monitoring circuit of the present invention.

As shown in FIG. 33, in the threshold process 644, the voltage value x of sampling data is classified as the mark level distribution and the space level distribution on the basis of two thresholds $Vth_1$ ($=\mu_1$) and $Vth_0$ ($=\mu_0$).

In this instance, a line-symmetrical distribution is assumed for the threshold $Vth_1$ (or threshold $Vth_0$) of the actual distribution obtained by classification of the threshold process 644 as a distribution smaller than the threshold $Vth_1$ (or greater than the threshold $Vth_0$). Summing processes (682, 686) are conducted for squares of the sampling signal voltage respectively in the mark level actual distribution and the space level actual distribution as well as throughout the line symmetrical distribution. The above processes are repeated until all the data (Nsamp) stored in the memories are read out (684, 688).

In the Q value calculation 660, the Q value is calculated on the basis of the following formula by referring to sums of voltage values of the sampling signals ($X_0$, $X_1$), sums of voltage squares of the sampling signals ($Y_0$, $Y_1$) and numbers of distribution points ($N_0$, $N_1$) above obtained.

Figure 34:
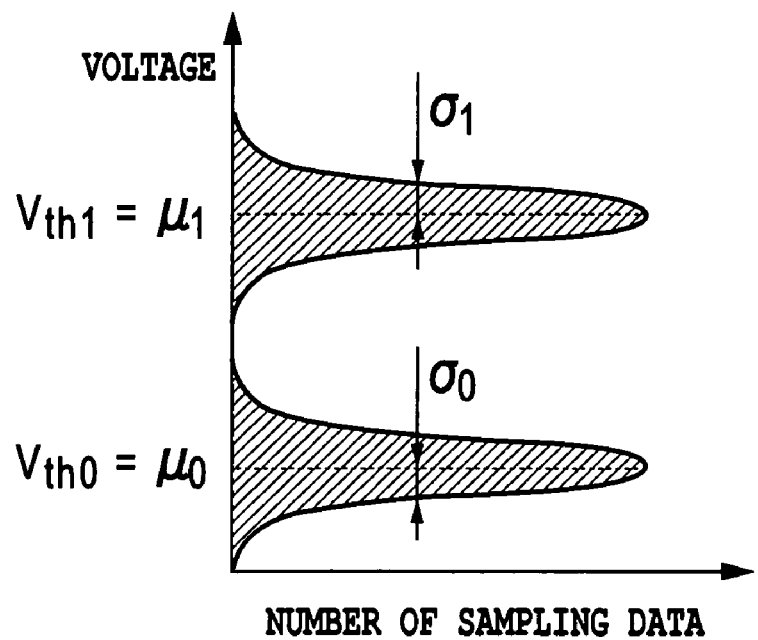
FIG. 34 is a diagram showing the signal processing in the optical signal quality monitoring circuit of the present invention.

As shown in FIG. 34, in the Q value calculation 660, the standard deviations $s_0$ and $s_1$ are determined respectively for a distribution consisting of the mark level actual distribution and the line symmetrical distribution (distribution line-symmetrical to the average $\mu_1$ obtained in the average value calculation 690) and a distribution consisting of a space level actual distribution and a line symmetrical distribution (distribution line-symmetrical to the average $\mu_0$ obtained in the average value calculation 690), thereby the Q value is calculated.

$$\sigma_0 = Sqrt\left[\frac{Y_0}{2N_0} - \mu_0^2\right] \quad \text{[Formula 2]}$$

$$\sigma_1 = Sqrt\left[\frac{Y_1}{2N_1} - \mu_1^2\right]$$

$$q = \frac{\mu_1 - \mu_0}{\sigma_1 + \sigma_0}$$

A Q value (q) obtained by the Q value calculation 660 corresponds to a Q value on the basis of a position at which the eye opening is maximized. Where it is necessary to correct the Q value to be convertible to a bit error rate, correction factors are corrected by using values corresponding to individual signal bit rates (for example, Ethernet (registered trademark), 10 G Ethernet (registered trademark), FEC-encoded bit rate, SDH signal and OTN signal) as described for the Q value correction 366 in Embodiment 3.

In the averaging process 670, the Q value measurement is repeated the number of Mavg times (674) to obtain an average (675), by which a Q value representing the signal quality of the optical signal is finally obtained.

The obtained Q value is compared with a Qth that is a Q value predetermined as a signal deterioration threshold (606). When the obtained Q value is lower than the Qth, an alarm is issued (610).

At the same time, a continuously measured Q value is stored in RAM for every predetermined time (612) and a function is provided so as to refer to the Q value retrospectively.

A function is also provided, which notifies the Q value measured continuously and the Q value stored in RAM.

Embodiment 5

Figure 7:
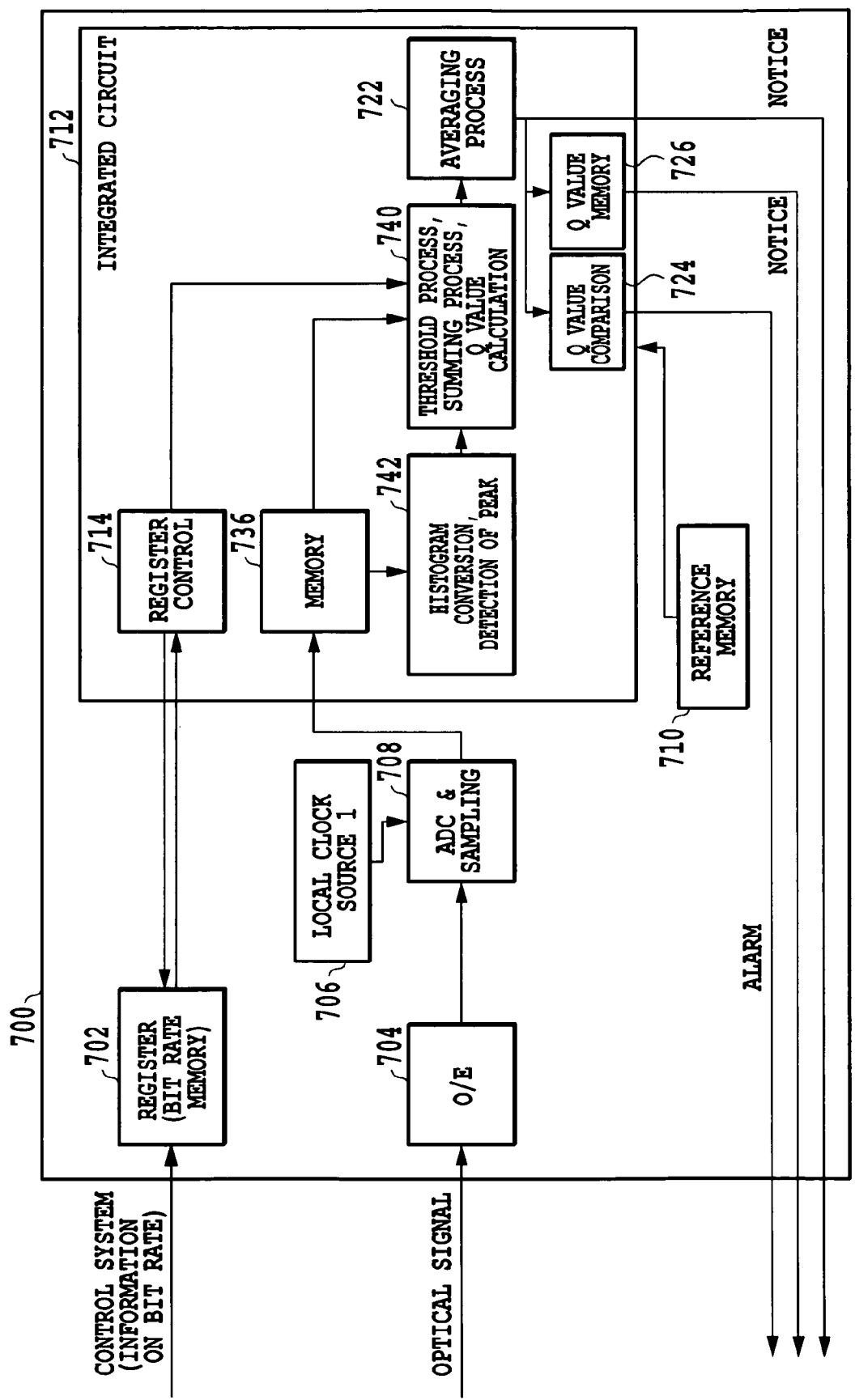
FIG. 7 is a block diagram showing the optical signal quality monitoring circuit shown in FIG. 1 to which an embodiment of the signal processing algorithm shown in FIG. 9 is applied.
Figure 8:
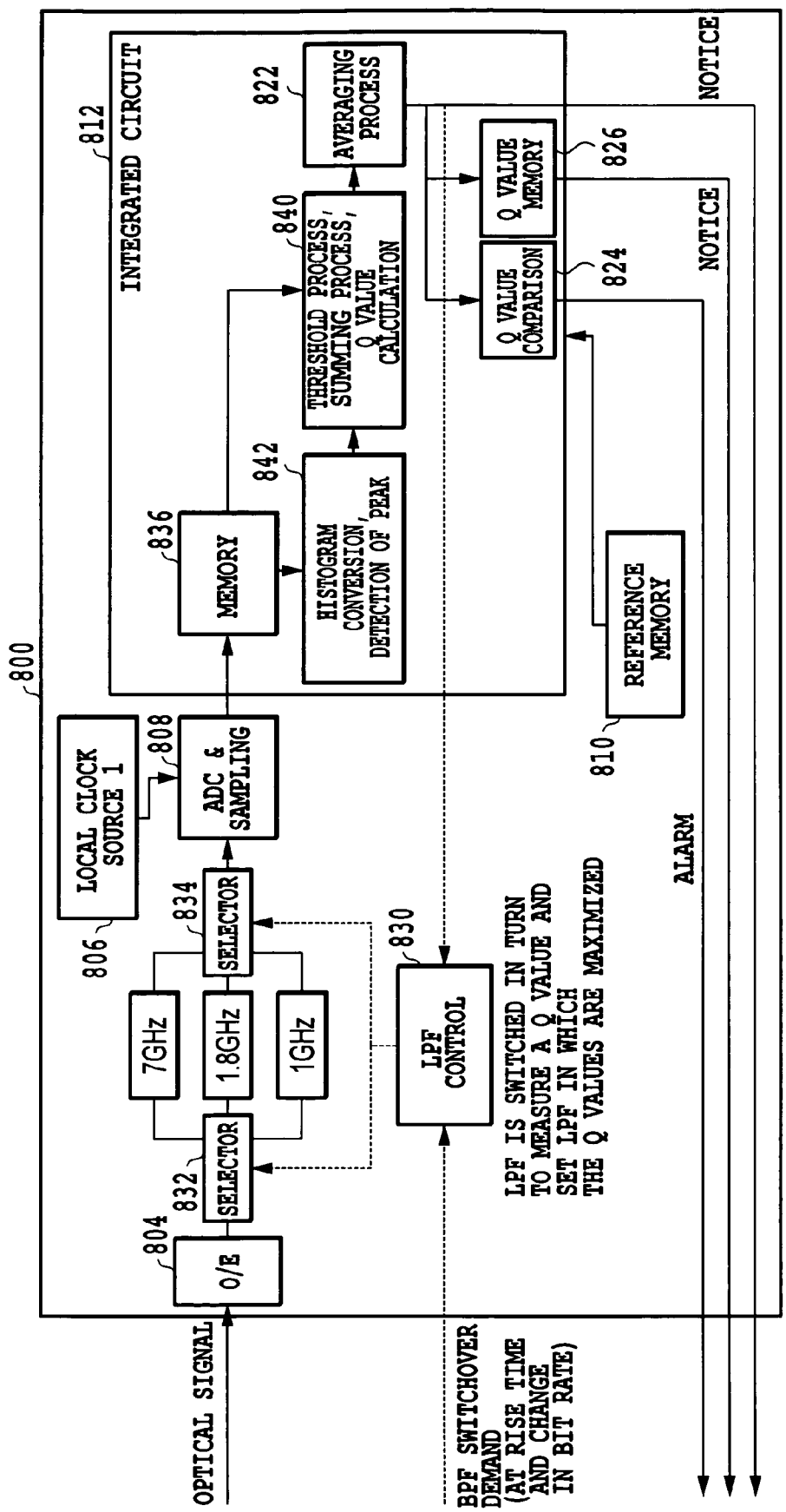
FIG. 8 is a block diagram showing the optical signal quality monitoring circuit shown in FIG. 2 to which an embodiment of the signal processing algorithm shown in FIG. 9 is applied.
Figure 9:
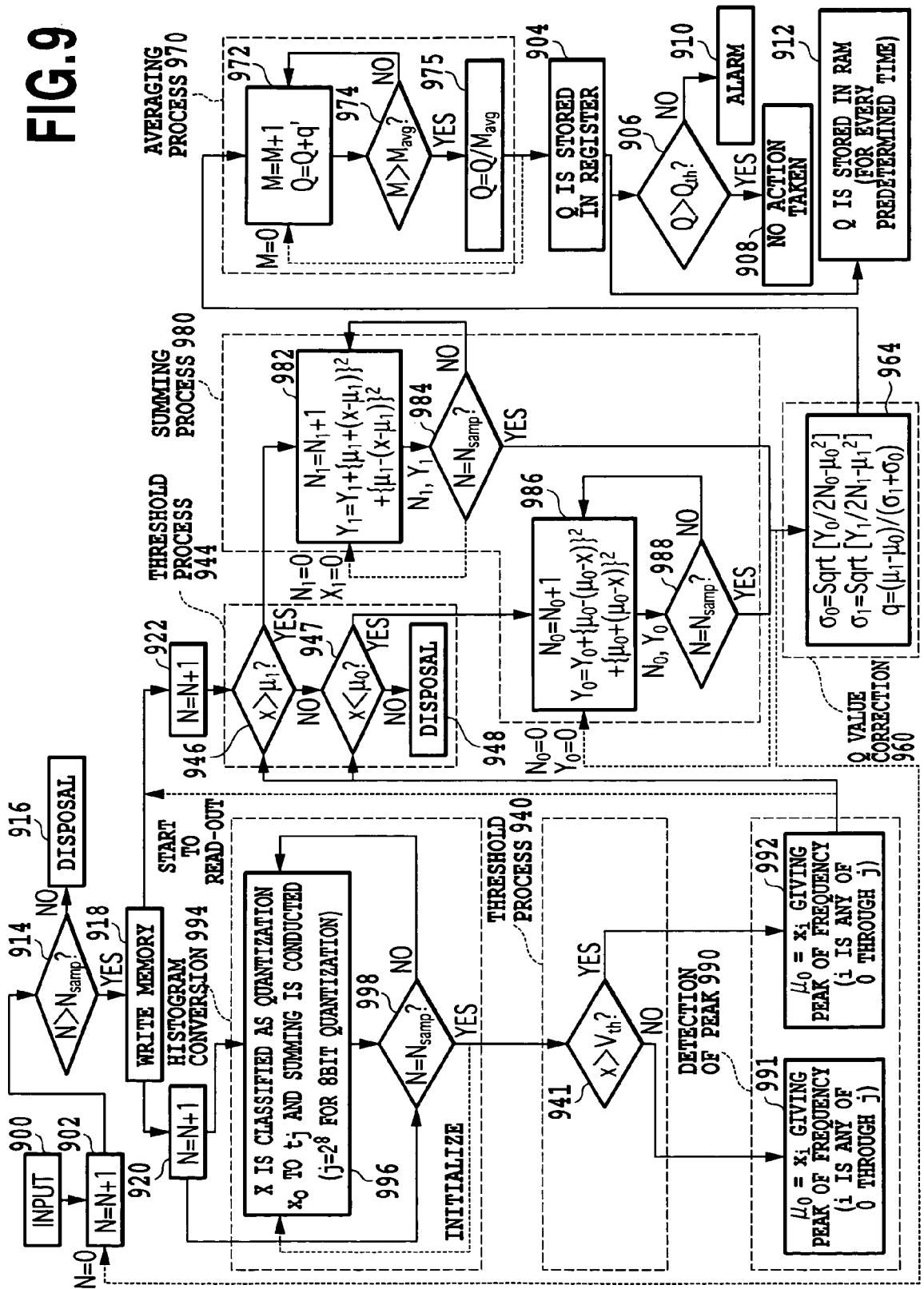
FIG. 9 is a flowchart showing another embodiment of the signal processing algorithm in the optical signal quality monitoring circuit of the present invention.

FIG. 9 is a flowchart showing another embodiment of the signal processing algorithm in the optical signal quality monitoring circuit of the present invention. The optical signal quality monitoring circuits shown in FIG. 7 and FIG. 8 correspond respectively to the optical signal quality monitoring circuits shown in FIG. 1 and FIG. 2, showing a case where the programmable integrated circuits 712 (FIG. 7) and 812 (FIG. 8) conduct the signal processing by using the algorithm of Embodiment 4.

The voltage value x of sampling data output from the ADC & samplers 708 (FIG. 7) and 508 (FIG. 5) and input into the programmable integrated circuits 712 (FIG. 7) and 812 (FIG. 8) is stored in memories (736 (FIG. 7) and 836 (FIG. 8)) until the number of sampling data reaches Nsamp which is a number necessary for measurement (914, 916, 918).

In the histogram conversion 994, the voltage value x of sampling data is classified as a quantization value $x_0$ to $x_j$ (j=$2^8$ for 8 bit quantization) and the frequency is summed (996). The process is repeated until the number of sampling data reaches Nsamp which is a number necessary for measurement (998).

A histogram whose amplitude is greater than the threshold Vth is given as a mark level histogram distribution and the histogram whose amplitude is smaller than the threshold Vth is given as a space level histogram distribution (threshold process 940).

Figure 35:
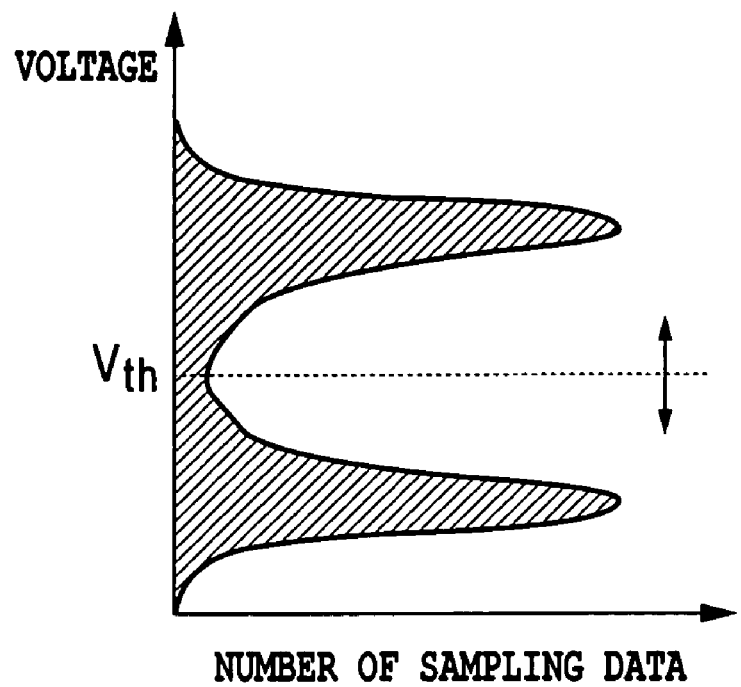
FIG. 35 is a diagram showing the signal processing in the optical signal quality monitoring circuit of the present invention.
Figure 36:
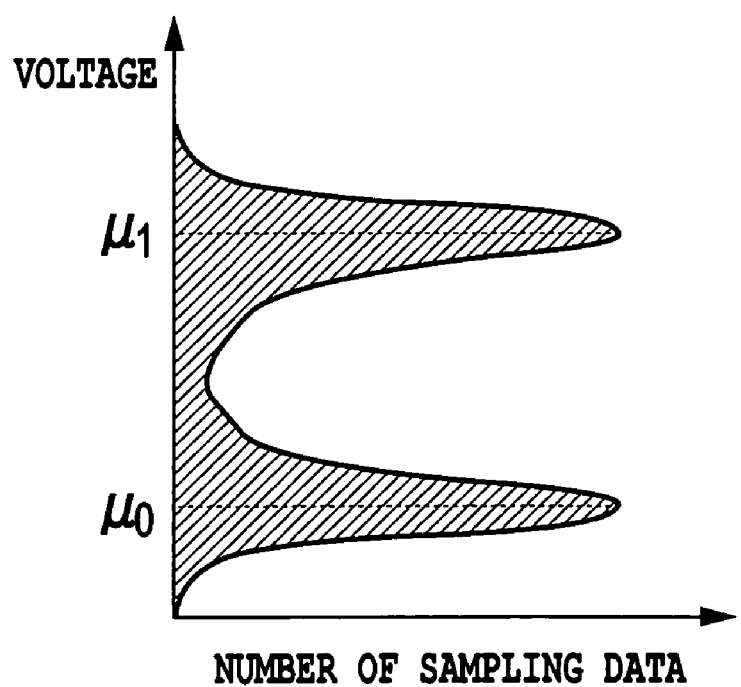
FIG. 36 is a diagram showing the signal processing in the optical signal quality monitoring circuit of the present invention.

As shown in FIG. 35, in the threshold process 940, the histogram is classified as the mark level histogram distribution and the space level histogram distribution on the basis of the threshold Vth.

In the peak detection 990, peak amplitude values for the respective distributions are given as average values $\mu_1$ and $\mu_0$ in the respective distributions (991, 992).

The obtained average values $\mu_1$ and $\mu_0$ are set respectively as thresholds $Vth_1$ and $Vth_0$. The voltages x of the sampling data stored in the memories are read out again, and then are compared with $\mu_1$ and $\mu_0$ to be classified as the mark level when greater than $Vth_1$ (=$\mu_1$), and as the space level when smaller than $Vth_0$ (=$\mu_0$) (threshold process 944).

Figure 37:
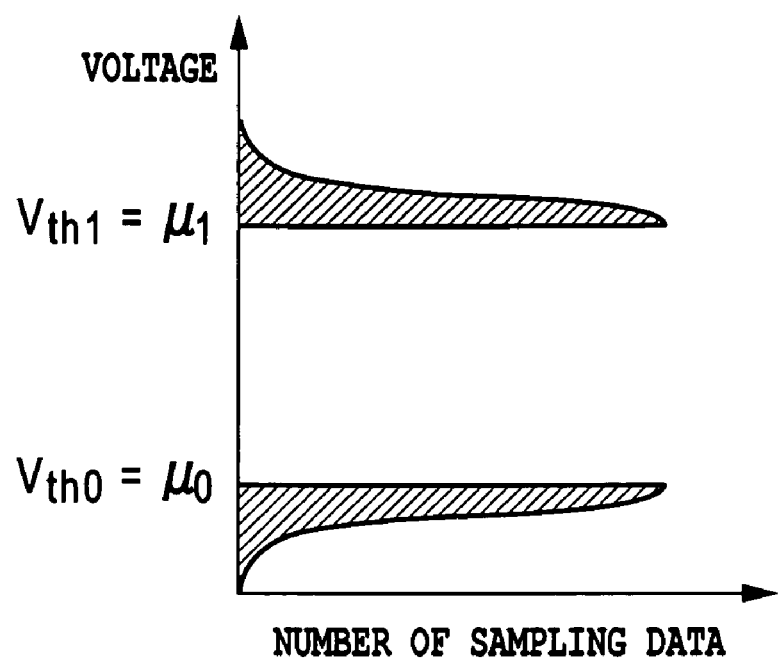
FIG. 37 is a diagram showing the signal processing in the optical signal quality monitoring circuit of the present invention.

As shown in FIG. 37, in the threshold process 944, the histogram is classified as the mark level histogram distribution and the space level histogram distribution on the basis of two threshold values of $Vth_1$ (=$\mu_1$) and $Vth_0$ (=$\mu_0$).

In this instance, a line-symmetrical distribution is assumed for $\mu_1$ (or $\mu_0$) of the actual distributions obtained by classification of the threshold process 944 as a distribution smaller than $\mu_1$ (or greater than $\mu_0$). In the summing process 980, summing processes (982, 986) are conducted for the number of sampling data and squares of the sampling data voltage respectively in the actual distribution and throughout the line symmetrical distribution. The above processes are repeated until all the data (Nsamp) stored in the memories are read out (984, 988).

In the Q value calculation 960, Q value is calculated on the basis of the following formula by referring to average values ($\mu_1, \mu_0$), sums of voltage squares of sampling data ($Y_0, Y_1$) and numbers of distribution points ($N_0, N_1$) obtained above for the mark level distribution and the space level distribution.

Figure 38:
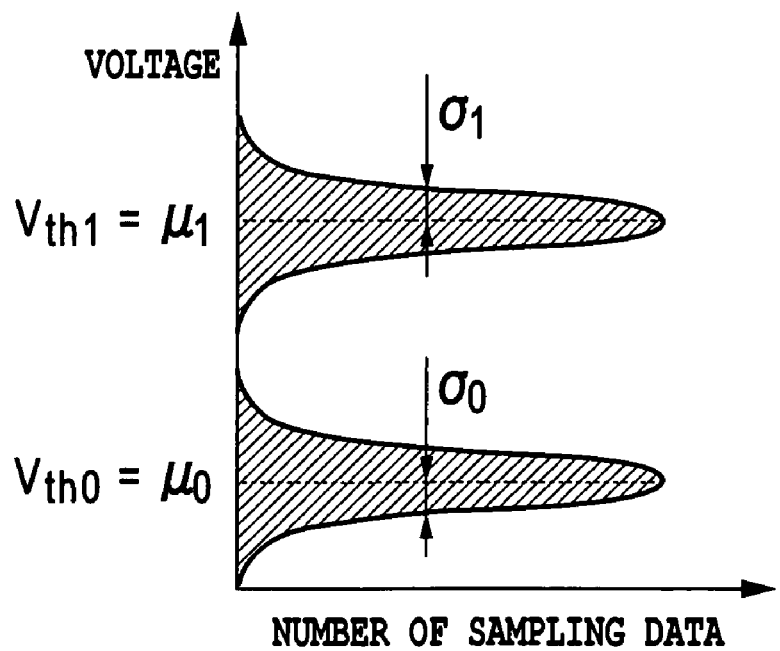
FIG. 38 is a diagram showing the signal processing in the optical signal quality monitoring circuit of the present invention.

As shown in FIG. 38, in the Q value calculation 960, the standard deviations $s_0$ and $s_1$ are determined respectively for a distribution consisting of a mark level actual distribution and a line symmetrical distribution (distribution line-symmetrical to the amplitude value $\mu_1$ of the peak obtained in the peak detection 990) and a distribution consisting of the space level actual distribution and the line-symmetrical distribution (distribution line-symmetrical to the amplitude value $\mu_0$ of the peak obtained in the peak detection 990), thereby the Q value.

$$\sigma_0 = Sqrt\left[\frac{Y_0}{2N_0} - \mu_0^2\right] \quad \text{[Formula 3]}$$

$$\sigma_1 = Sqrt\left[\frac{Y_1}{2N_1} - \mu_1^2\right]$$

$$q = \frac{\mu_1 - \mu_0}{\sigma_1 + \sigma_0}$$

A Q value (q) obtained by the Q value calculation 960 corresponds to a Q value on the basis of a position at which the eye opening is maximized. Where it is necessary to correct the Q value to be convertible to a bit error rate, correction factors are corrected by using values corresponding to individual signal bit rates (for example, Ethernet (registered trademark), 10G Ethernet®, FEC-encoded bit rate, SDH signal and OTN signal), as described for the Q value correction 366 in Embodiment 3.

In the averaging process 970, the Q value measurement is repeated the number of Mavg times (974) to obtain an average (975), by which a Q value representing the signal quality of the optical signal is finally obtained.

The obtained Q value is compared with a Qth that is a Q value predetermined as a signal deterioration threshold (906). When the obtained Q value is lower than the Qth, an alarm is issued (910).

At the same time, a continuously measured Q value is stored in RAM for every predetermined time (912) and a function is provided so as to refer to the Q value retrospectively.

A function is also provided, which notifies the Q value measured continuously and the Q value stored in RAM.

Embodiment 6

Figure 10:
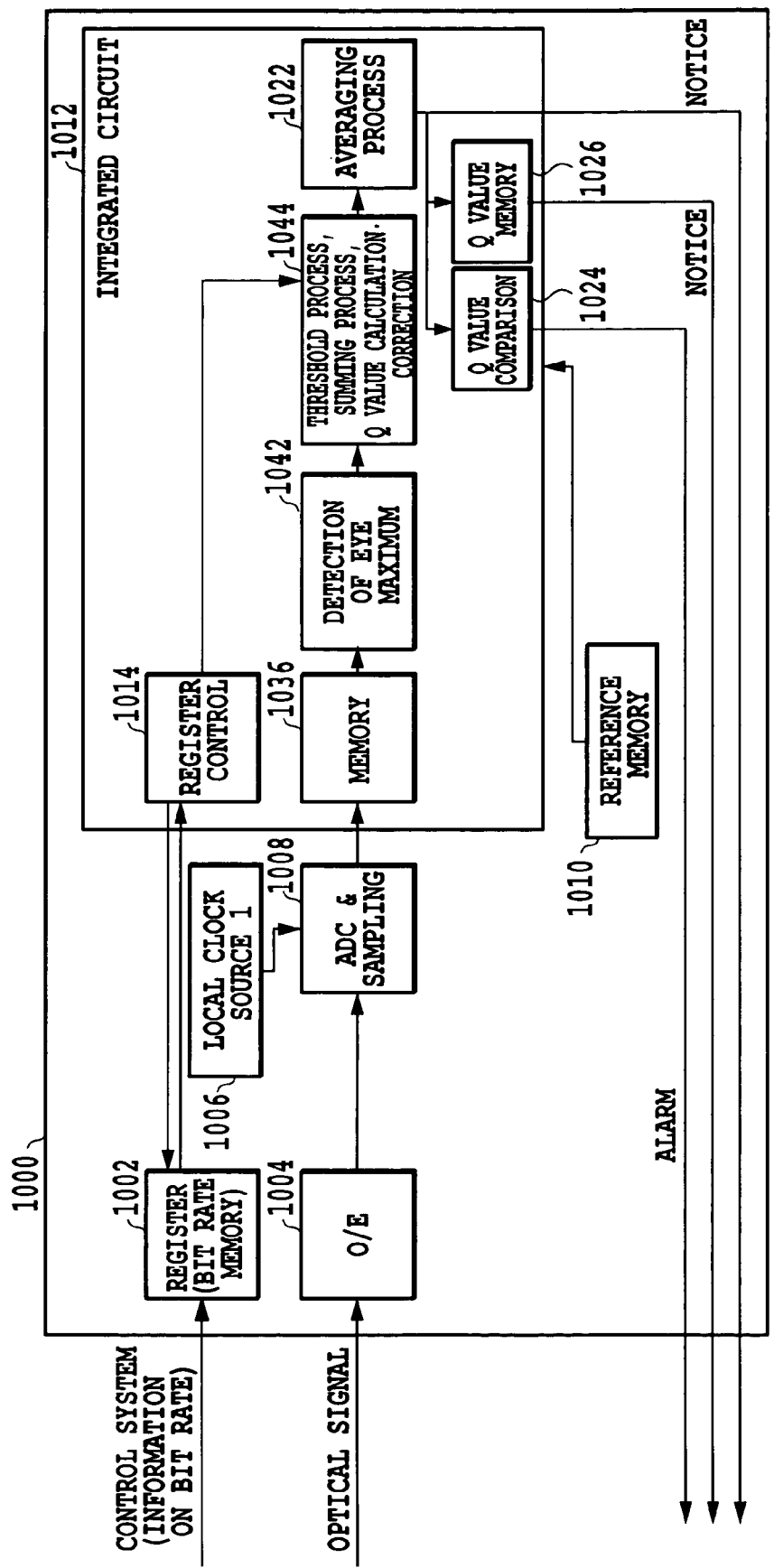
FIG. 10 is a block diagram showing the optical signal quality monitoring circuit shown in FIG. 1 to which an embodiment of the signal processing algorithm shown in FIG. 12
Figure 11:
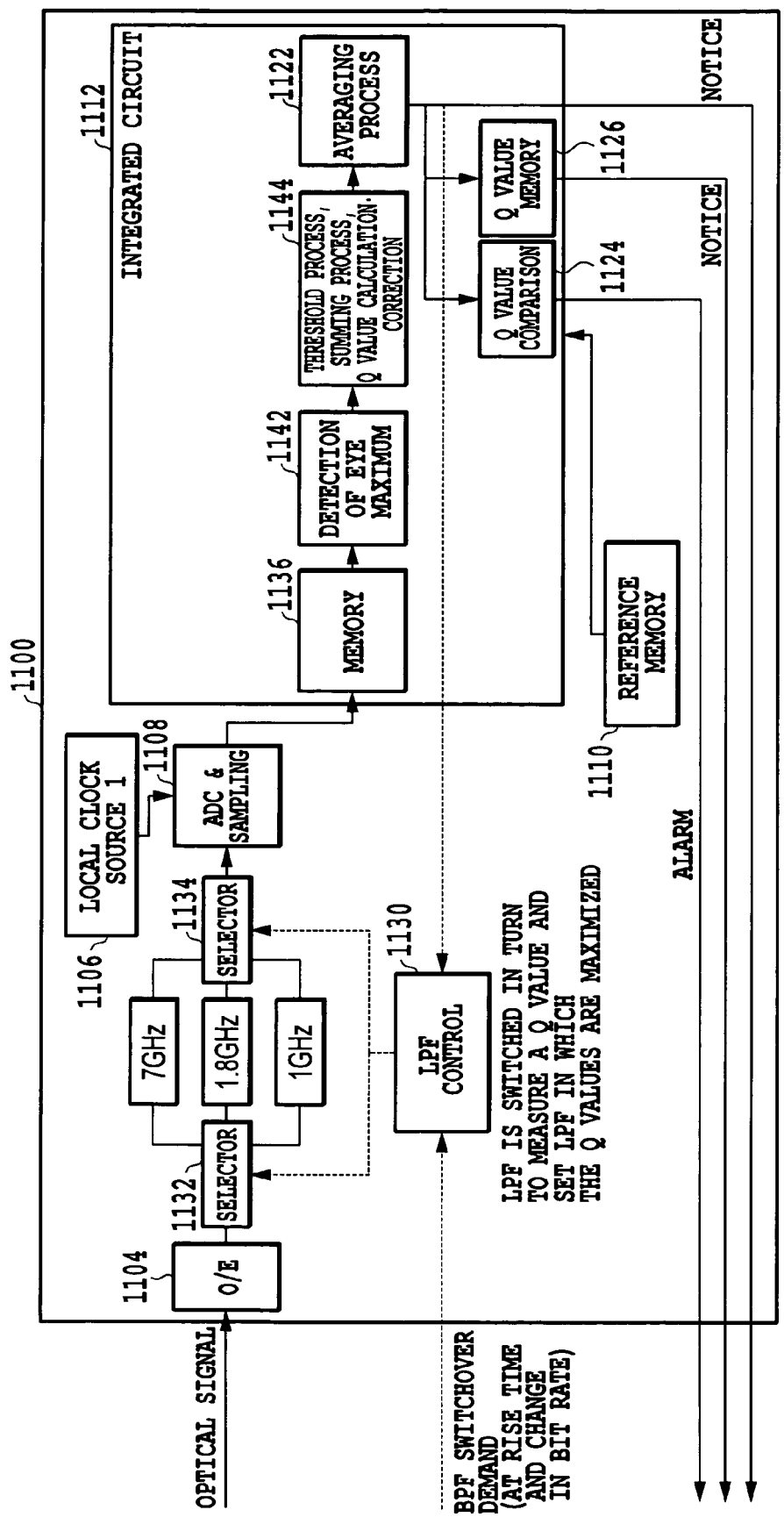
FIG. 11 is a block diagram showing the optical signal quality monitoring circuit shown in FIG. 2 to which an embodiment of the signal processing algorithm shown in FIG. 12
Figure 12:
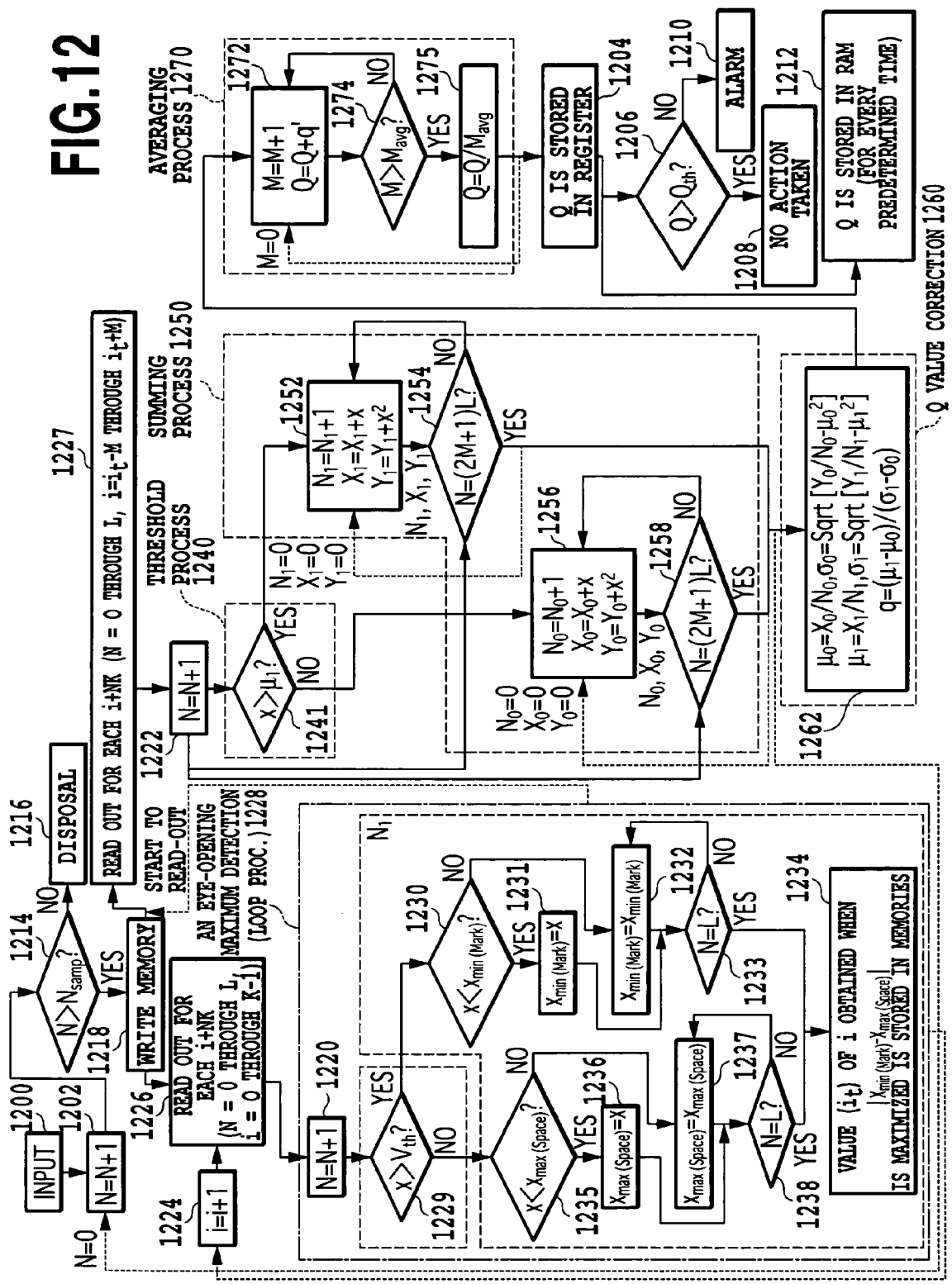
FIG. 12 is a flowchart showing another embodiment of the signal processing algorithm in the optical signal quality monitoring circuit of the present invention.

FIG. 12 is a flowchart showing another embodiment of the signal processing algorithm in the optical signal quality monitoring circuit of the present invention. The optical signal quality monitoring circuits 1000 (FIG. 10) and 1100 (FIG. 11) shown in FIG. 10 and FIG. 11 correspond respectively to the optical signal quality monitoring circuits 100 and 200 shown in FIG. 1 and FIG. 2, showing a case where the programmable integrated circuits 1012 (FIG. 10) and 1112 (FIG. 11) conduct the signal processing by using the algorithm of Embodiment 6. The voltage value x of sampling data output from the ADC & samplers 1008 (FIG. 10) and 1108 (FIG. 11) and input into the programmable integrated circuits 1012 (FIG. 10) and 1112 (FIG. 11) is stored in memories (1036 (FIG. 10) and 1136 (FIG. 11)) until the number of sampling data reaches Nsamp which is a number necessary for measurement (1214, 1216, 1218).

The voltage value x of sampling data is read out for every i+NK (1226), however, on the condition that i is an integer from 0 to K−1, and N is an integer from 0 to L. In this instance, Nsamp is equal to LK.

In this instance, the repetition frequency $f_1$ can be adjusted so as to satisfy $f_1=(n/m)f_0 \pm a$ and $(n/m)^2/\{k+(n/m)\}f_0 \leq a < (n/m)^2/\{k+(n/m)-1\}f_0$ (n, m and k are natural numbers), and where K is equal to pk (p is a positive integer), N can be expressed to be equal to $(n/m)^{-1}$ p.

For each integer of i from 0 to K−1, the sampling data whose amplitude is greater than the threshold Vth is classified as a mark level and the sampling data whose amplitude is smaller than the threshold Vth is classified as a space level (1229). For N from 0 to L, sampling data of L piece is classified as the mark level and the space level. Then, a minimum value of the voltage value x in the mark level is designated as $X_{min(Mark)}$ (1230, 1231) and a maximum value of the voltage value x in the space level is designated as $x_{max(space)}$ (1235, 1236)

Then, a value of i ($i_t$) is detected when $|x_{min(Mark)} - max(Space)|$ is maximized (1234).

Then, for i (i=$i_t$-M through $i_t$+M; M is an integer), sampling data is read out from the sampling data memory (1227).

In the threshold process 1240, the sampling data read out again whose amplitude is greater than threshold Vth is classified as a mark level distribution and the sampling data whose amplitude is smaller than threshold Vth is classified as a space level distribution (1241).

In the summing process 1250, the number of sampling data ($N_0$, $N_1$) are subjected to summing process, voltage values of sampling data ($X_0$, $X_1$) are summed and voltage squares of sampling data ($Y_0$, $Y_1$) are subjected to the summing process (1252, 1256). In the Q value calculation 1260, a Q value is calculated on the basis of the following formula by referring to sums of voltage values of sampling data ($X_0$, $X_1$), sums of voltage squares of sampling data ($Y_0$, $Y_1$) and numbers of distribution points ($N_0$, $N_1$).

$$\mu_0 = \frac{X_0}{N_0}, \sigma_0 = Sqrt\left[\frac{Y_0}{N_0} - \mu_0^2\right] \quad \text{[Formula 4]}$$

$$\mu_1 = \frac{X_1}{N_1}, \sigma_1 = Sqrt\left[\frac{Y_1}{N_1} - \mu_1^2\right]$$

$$q = \frac{\mu_1 - \mu_0}{\sigma_1 - \sigma_0}$$

A Q value obtained by the Q value calculation 1260 corresponds to a Q value on the basis of a position at which the eye opening is maximized. Where it is necessary to correct the Q value to be convertible to a bit error rate, correction factors are corrected by using values corresponding to individual signal bit rates (for example, Ethernet (registered trademark), 10 G Ethernet (registered trademark), FEC-encoded bit rate, SDH signal and OTN signal) as described for the Q value correction 366 in Embodiment 3.

In the averaging process 1270, the Q value measurement is repeated the number of Mavg times (1274) to obtain an average (1275), by which a Q value representing the signal quality of the optical signal is finally obtained.

The obtained Q value is compared with a Qth that is a Q value predetermined as a signal deterioration threshold (1206). When the obtained Q value is lower than the Qth, an alarm is issued (1210).

At the same time, a continuously measured Q value is stored in RAM for every predetermined time (1212) and a function is provided so as to refer to the Q value retrospectively.

A function is also provided, which notifies the Q value measured continuously and the Q value stored in RAM.

Embodiment 7

Figure 13:
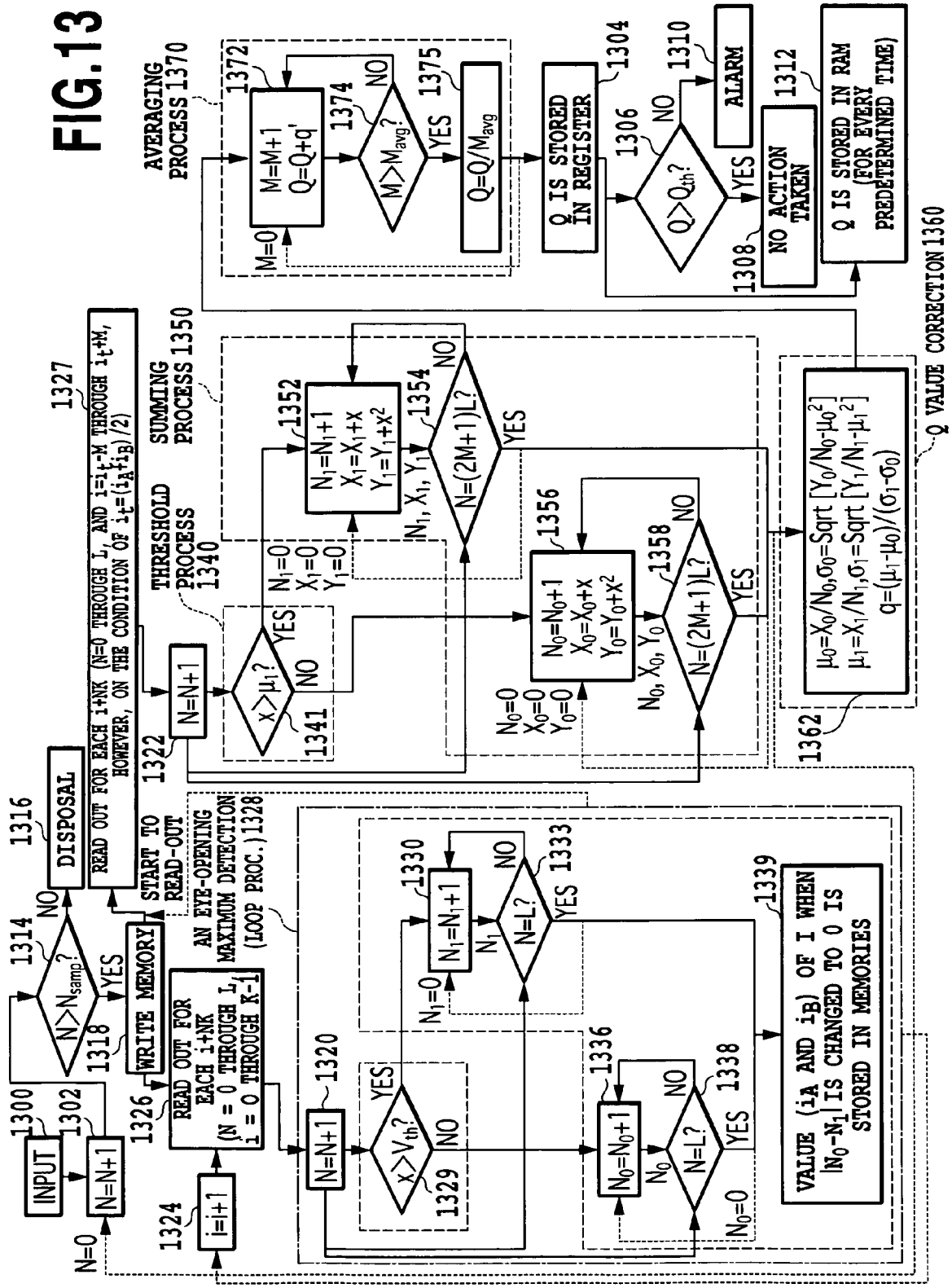
FIG. 13 is applied.

FIG. 13 shows another embodiment of the signal processing algorithm in the optical signal quality monitoring circuit of the present invention. The optical signal quality monitoring circuits 1000 (FIG. 10) and 1100 (FIG. 11) shown in FIG. 10 and FIG. 11 also correspond to a case where the programmable integrated circuits 1012 (FIG. 10) and 1112 (FIG. 11) conduct the signal processing by using the algorithm of Embodiment 7. The voltage value x of sampling data output from the ADC & samplers 1008 (FIG. 10) and 1108 (FIG. 11) and input into the programmable integrated circuits 1012 (FIG. 10) and 1112 (FIG. 11) is stored in memories (1036 (FIG. 10) and 1136 (FIG. 11)) until the number of sampling data reaches Nsamp which is a number necessary for measurement (1314, 1316, 1318).

The voltage value x of sampling data is read out for every i+NK (1326), however, on the condition that i is an integer from 0 to K−1, and N is an integer from 0 to L. In this instance, Nsamp is equal to LK.

In this instance, the repetition frequency $f_1$ can be adjusted so as to satisfy $f_1=(n/m)f_0 \pm a$ and $(n/m)^2/\{k+(n/m)\}f_0 \leq a < (n/m)^2/\{k+(n/m)-1\}f_0$ (n, m and k are natural numbers), and where K is equal to pk (p is a positive integer), N can be expressed to be equal to $(n/m)^{-1}$ p.

For each integer of i from 0 to K−1, the sampling data whose amplitude is greater than the threshold Vth' is classified as a mark level and the sampling data whose amplitude is smaller than the threshold Vth' is classified as a space level (1329). For N from 0 to L, sampling data of L piece is classified as the mark level and the space level. Then, the number of data in the mark level is given as $N_1$ number (1330) and that in the space level is given as $N_0$ number (1336).

A value of i ($i_A$) when $|N_1-N_0|$ changes from a finite value to 0 and a value of i ($i_B$) when it changes from 0 to a finite value are detected (1339). In this instance, an eye-opening maximum detection for detecting a part whose eye opening is maximized corresponds to a determination of $i_t$ which is defined as $i_t=(i_A+i_B)/2$.

Sampling data in the vicinity of the part whose eye opening is maximized is read out from memories. To be specific, for i (i=$i_t$-M through $i_t$+M; M is an integer), sampling data is read out from the memories (1327).

In the threshold process 1340, the sampling data read out again whose amplitude is greater than threshold Vth is classified as a mark level distribution and the sampling data whose amplitude is smaller than threshold Vth is classified as a space level distribution (1341).

In the summing process 1350, the number of sampling data ($N_0$, $N_1$) are subjected to summing process, voltage values of sampling data ($X_0$, $X_1$) are added and voltage squares of sampling data ($Y_0$, $Y_1$) are subjected to the summing process (1352, 1356). In the Q value calculation 1360, a Q value is calculated on the basis of the following formula by referring to sums of voltage values of sampling data ($X_0$, $X_1$), sums of voltage squares of sampling data ($Y_0$, $Y_1$) and numbers of distribution points ($N_0$, $N_1$).

$$\mu_0 = \frac{X_0}{N_0}, \sigma_0 = Sqrt\left[\frac{Y_0}{N_0} - \mu_0^2\right] \quad \text{[Formula 5]}$$

$$\mu_1 = \frac{X_1}{N_1}, \sigma_1 = Sqrt\left[\frac{Y_1}{N_1} - \mu_1^2\right]$$

$$q = \frac{\mu_1 - \mu_0}{\sigma_1 - \sigma_0}$$

A Q value obtained by the Q value calculation 1360 corresponds to a Q value on the basis of a position at which the eye opening is maximized. Where it is necessary to correct the Q value to be convertible to a bit error rate, correction factors are corrected by using values corresponding to individual signal bit rates (for example, Ethernet (registered trademark), 10 G Ethernet (registered trademark), FEC-encoded bit rate, SDH signal and OTN signal), as described for the Q value correction 366 in Embodiment 3.

In the averaging process 1370, the Q value measurement is repeated the number of Mavg times (1374) to obtain an average (1375), by which a Q value representing the signal quality of the optical signal is finally obtained.

The obtained Q value is compared with a Qth that is a Q value predetermined as a signal deterioration threshold (1306). When the obtained Q value is lower than the Qth, an alarm is issued (1310).

At the same time, a continuously measured Q value is stored in RAM for every predetermined time (1312) and a function is provided so as to refer to the Q value retrospectively.

A function is also provided, which notifies the Q value measured continuously and the Q value stored in RAM.

Embodiments 8 to 10

Figure 14:
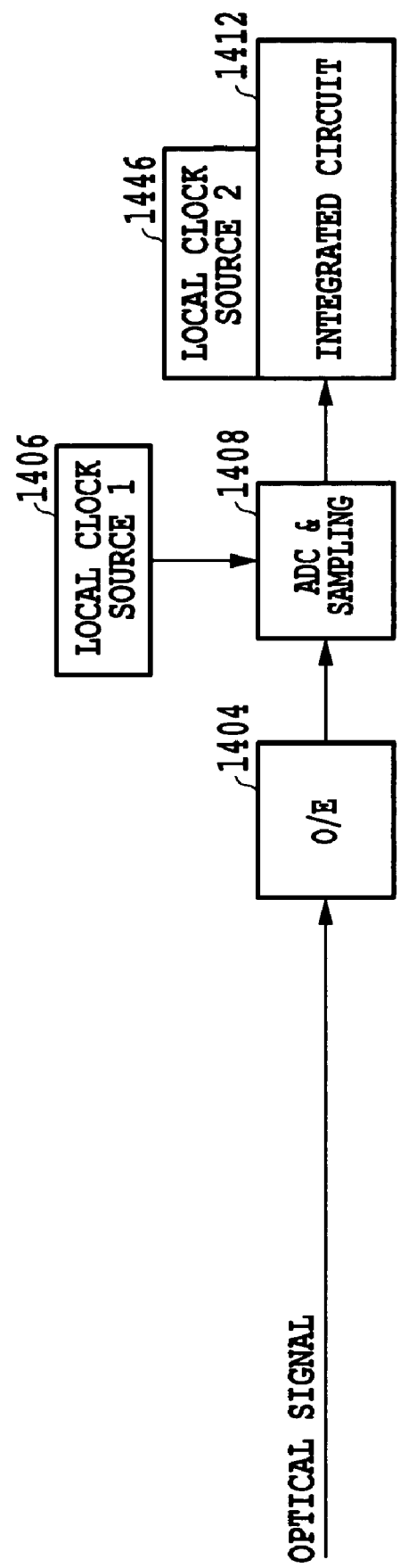
FIG. 14 is a block diagram showing another embodiment of the optical signal quality monitoring circuit in the present invention.
Figure 15:
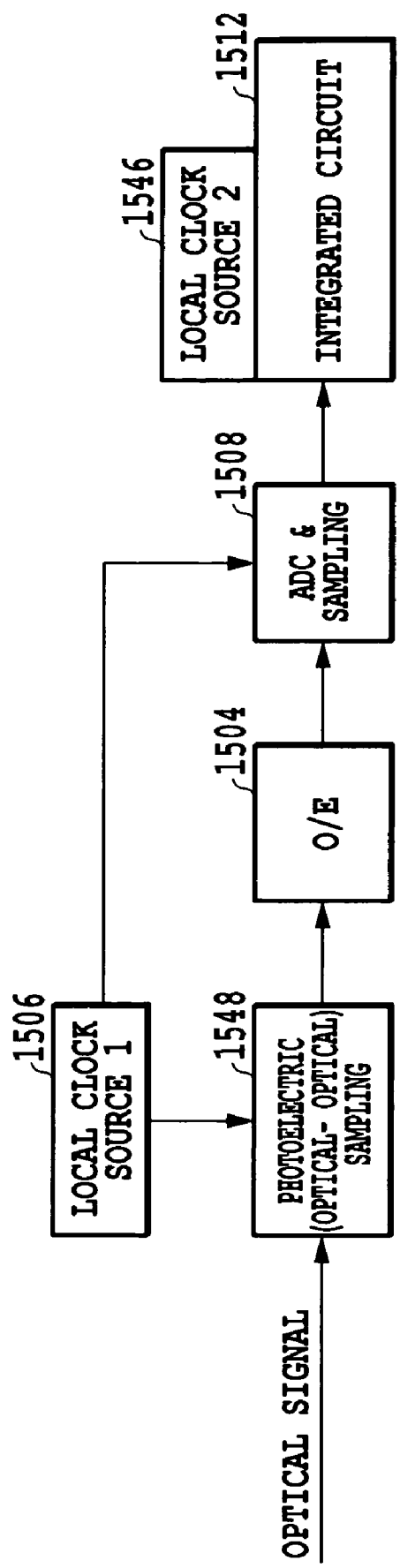
FIG. 15 is a block diagram showing another embodiment of the optical signal quality monitoring circuit in the present invention.
Figure 16:
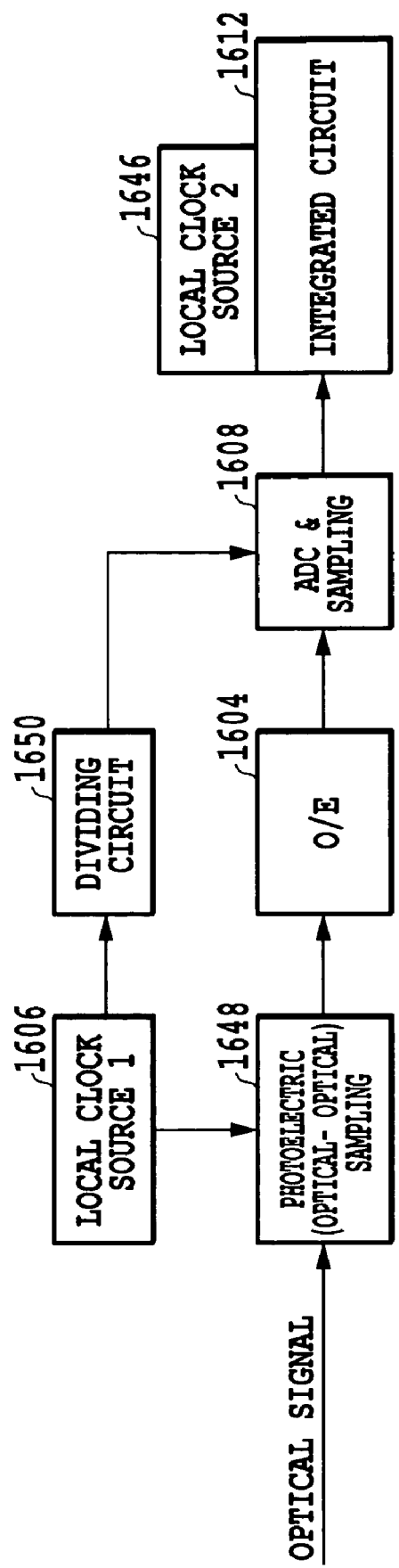
FIG. 16 is a block diagram showing another embodiment of the optical signal quality monitoring circuit in the present invention.

FIG. 14 through FIG. 16 respectively show block diagrams of Embodiments 8 through 10 of the optical signal quality monitoring circuit of the present invention. Embodiment 8 in FIG. 14 shows an embodiment that an optical electrical converter (O/E) 1404 subjects an optical signal directly to a photoelectric conversion to output an electrical signal, then the ADC & sampler 1408 subjects the electrical signal output from the optical electrical converter 1404 to sampling and an analog to digital conversion to conduct the signal processing in the integrated circuit 1412.

This embodiment shows a case where a clock used in sampling by the ADC & sampler 1408 and in the analog to digital conversion is independent of a clock used in the signal processing in the integrated circuit 1412.

Embodiment 9 in FIG. 15 shows a case where an optical signal is converted to a sampling optical signal through a photoelectric sampler in which an optical signal is sampled by utilizing electroabsorption based on electrical pulse or through an optical-optical sampler 1548 in which an optical signal is sampled by utilizing a non-linear optical effect based on optical pulse. The sampling optical signal is subjected to a photoelectric conversion in the ADC & sampler 1508 and then to an electrical signal processing in the integrated circuit 1512. In this instance, since the optical signal is sampled at a stage of light, only a peak intensity of the sampling optical signal may be detected in the ADC & sampler 1508 after conversation to the electrical signal. Therefore, the band of the photoelectric conversion 1504 or the ADC & sampler 1508 can be made smaller than that of the optical signal bit rate. A case where a common clock is used in the photoelectric (optical-optical) sampler 1548 and in the ADC & sampler 1508, and independent of a clock used in the integrated circuit 1512 is shown.

In Embodiment 10 shown in FIG. 16, a clock used in the ADC & sampler 1608 and a clock used in the photoelectric (optical-optical) sampler 1648 are supplied from the same local clock source 1 (1606). The clock supplied to the ADC & sampler 1608 is divided by a dividing circuit 1650. Data can be taken at a shorter time as the sampling speed is faster. Therefore, a faster sampling speed is desirable. The dividing circuit 1650 may be used to design a clock system, if there is a restriction on the repeated frequency of the clock used in the ADC & sampler 1608.

The integrated circuits of optical signal quality monitoring circuits described in Embodiments 8 through 10 are able to conduct the signal processing by using any of the algorithms described in Embodiments 3 through 7.

Embodiments 11 through 13

Figure 17:
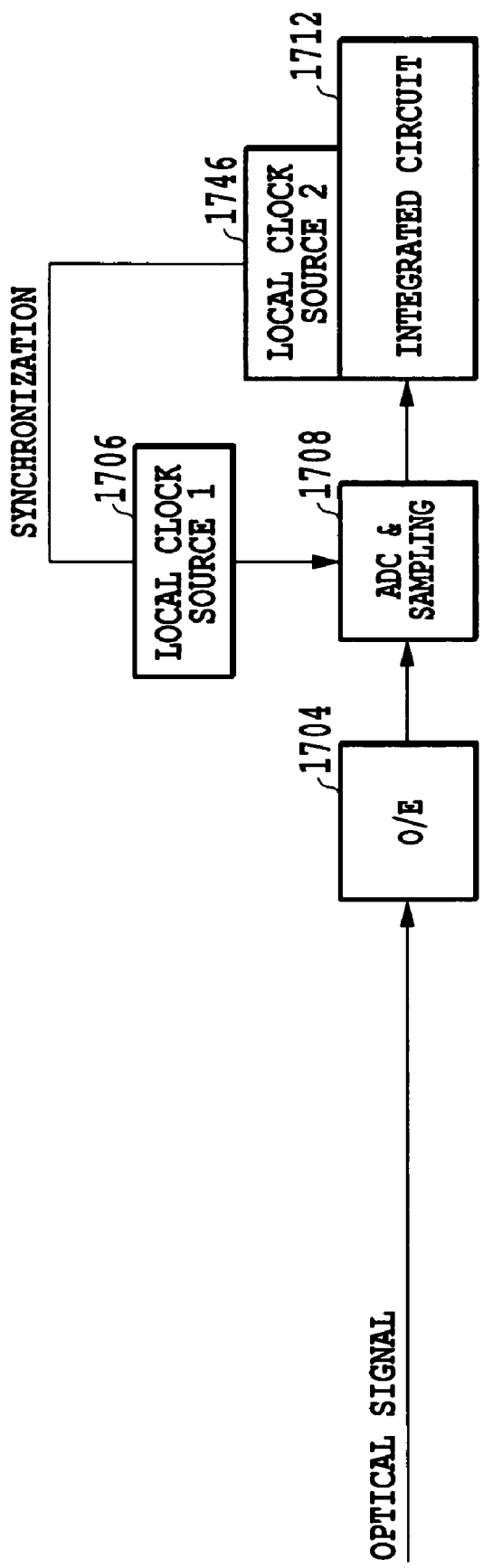
FIG. 17 is a block diagram showing another embodiment of the optical signal quality monitoring circuit in the present invention.
Figure 18:
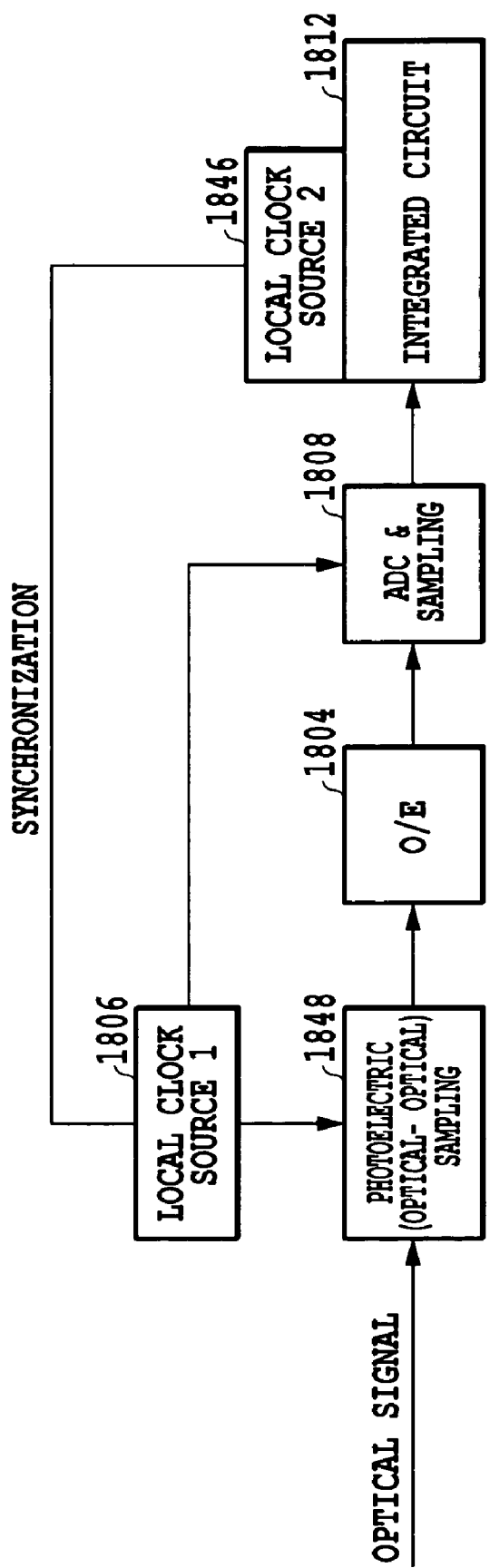
FIG. 18 is a block diagram showing another embodiment of the optical signal quality monitoring circuit in the present invention.
Figure 19:
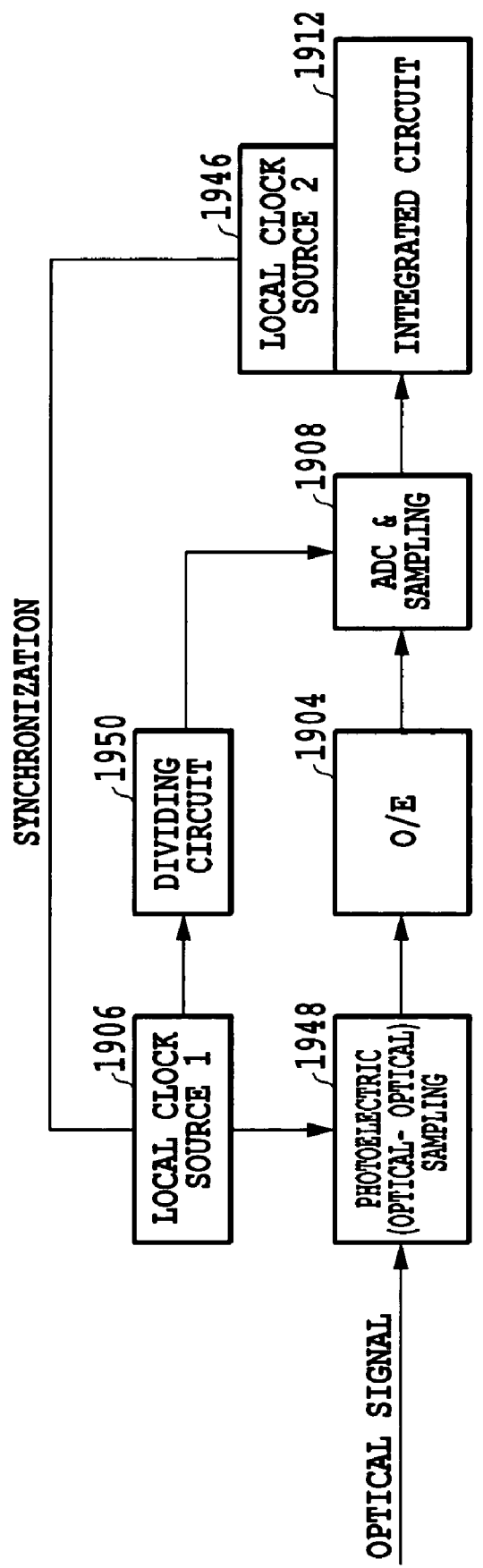
FIG. 19 is a block diagram showing another embodiment of the optical signal quality monitoring circuit in the present invention.

FIG. 17 through FIG. 19 respectively show block diagrams of Embodiments 11 through 13 in optical signal quality monitoring circuits of the present invention. Embodiments 11 through 13 respectively correspond to Embodiments 8 through 10. These embodiments are different from Embodiments 8 through 10 in that clocks used in the ADC & samplers (1708, 1808 and 1908) and the photoelectric (optical-optical) samplers (1848 and 1948) are synchronized with the clocks used in the integrated circuits (1712, 1812, 1912). In these embodiments, the integrated circuits (1712, 1812 and 1912) are also able to conduct the signal processing by using an algorithm given in any of FIG. 3, FIG. 6, FIG. 9 or FIG. 12.

The integrated circuits of the optical signal quality monitoring circuits described in Embodiments 11 through 13 are able to conduct the signal processing by using any algorithm given in Embodiments 3 through 7.

Embodiments 14 through 16

Figure 20:
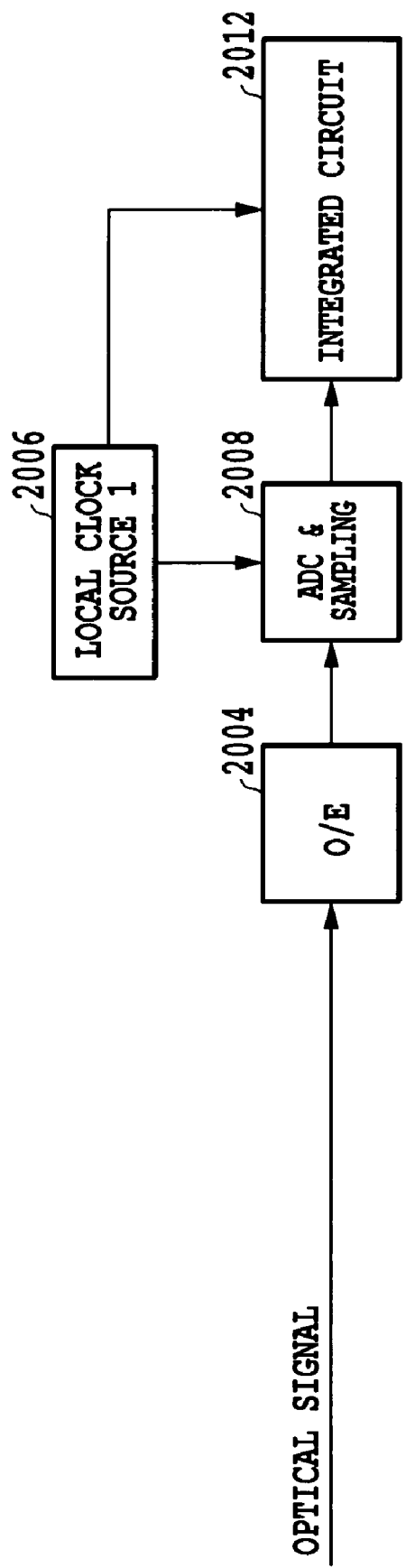
FIG. 20 is a block diagram showing another embodiment of the optical signal quality monitoring circuit in the present invention.
Figure 21:
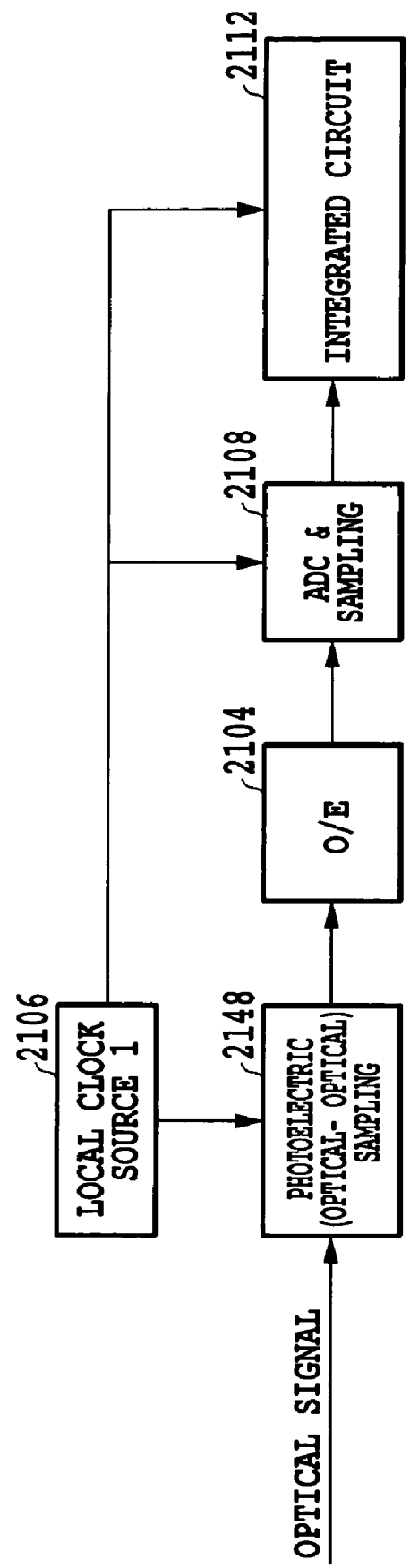
FIG. 21 is a block diagram showing another embodiment of the optical signal quality monitoring circuit in the present invention.
Figure 22:
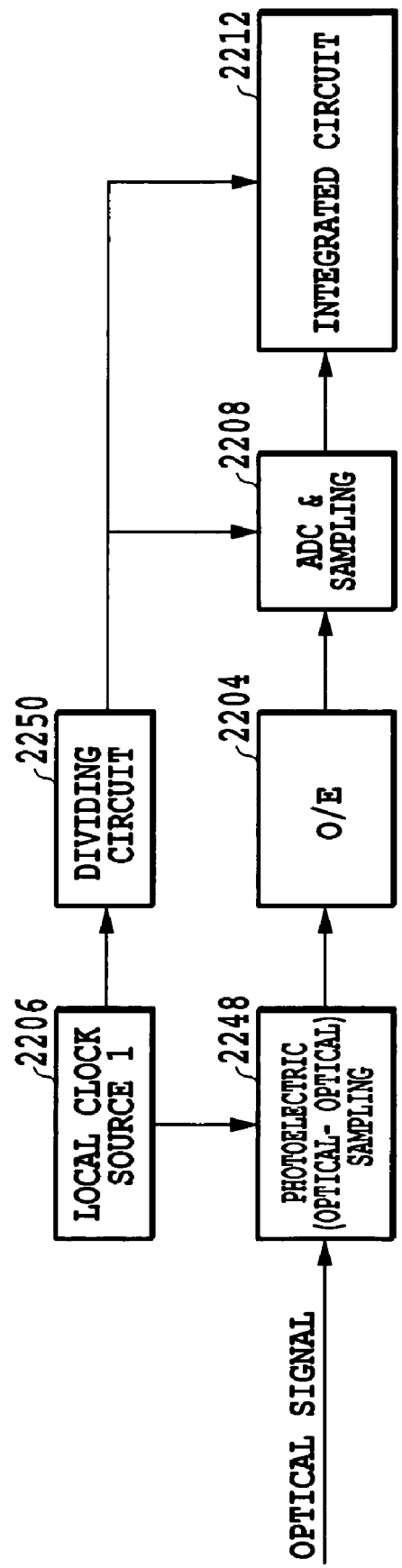
FIG. 22 is a block diagram showing another embodiment of the optical signal quality monitoring circuit in the present invention.

FIG. 20 through FIG. 22 respectively show block diagrams of Embodiments 14 through 16 of the optical signal quality monitoring circuits of the present invention. Embodiments 14 through 16 respectively correspond to Embodiments 8 through 10. Embodiments 14 through 16 are different from Embodiments 8 through 10 in that clocks used in the ADC & samplers (2008, 2108 and 2208) and the photoelectric (optical-optical) samplers (2148 and 2248) are common to the clocks used in the integrated circuits (2012, 2112 and 2212). In these embodiments, the integrated circuits (1712, 1812 and 1912) are also able to conduct the signal processing by using an algorithm given in any of FIG. 3, FIG. 6, FIG. 9 or FIG. 12.

The integrated circuits of the optical signal quality monitoring circuits described in Embodiments 14 through 16 are able to conduct the signal processing by using any algorithm given in Embodiments 3 through 7.

Embodiment 17

Figure 23:
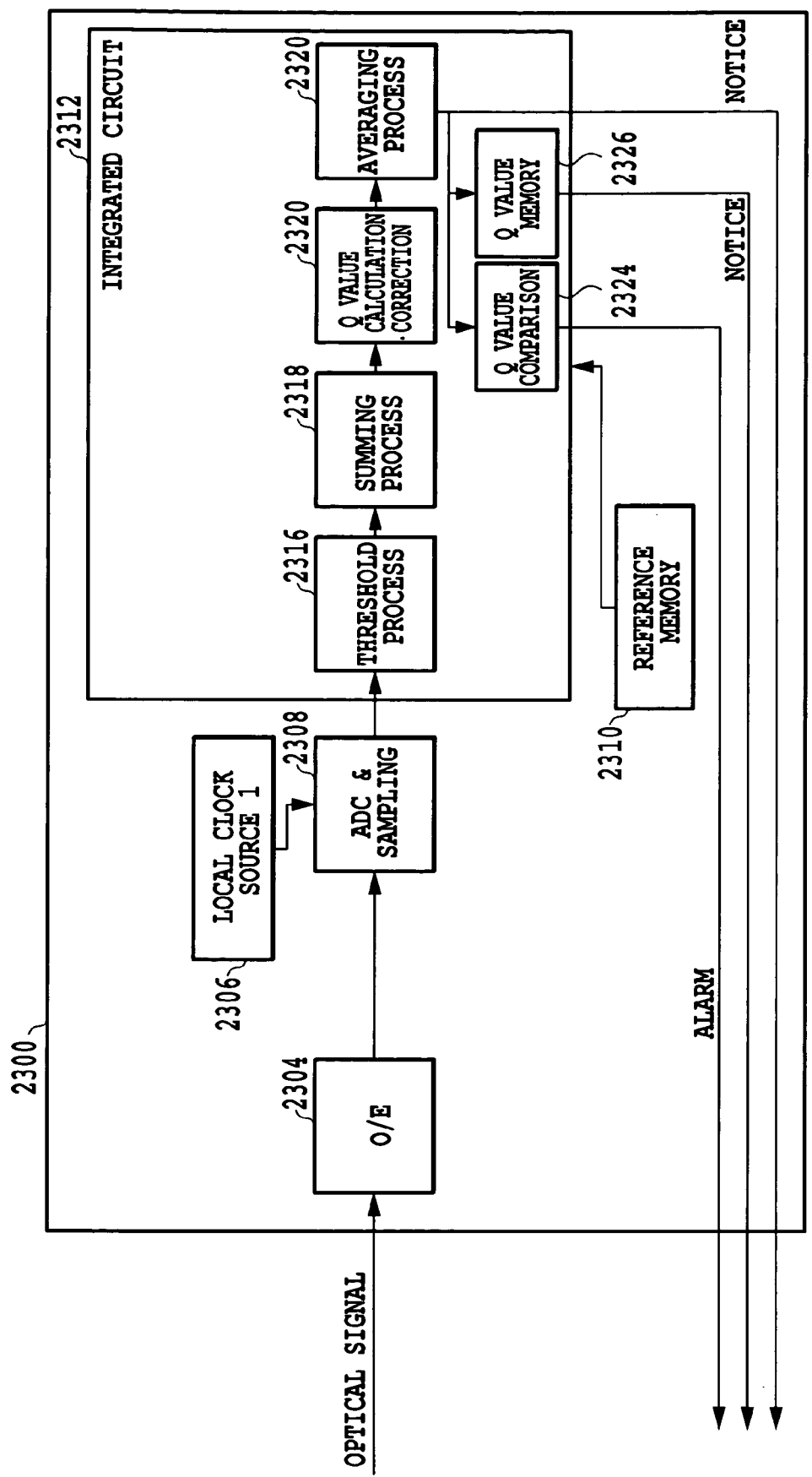
FIG. 23 is a block diagram showing another embodiment of the optical signal quality monitoring circuit in the present invention.

FIG. 23 shows a block diagram of another embodiment of the optical signal quality monitoring circuit in the present invention. The optical signal quality monitoring circuit 2300 is provided with an optical electrical converter (O/E) 2304 for subjecting an input optical signal of the optical signal bit rate $f_0$(bit/s) to a photoelectric conversion to output an electrical signal, a local clock source 1 (2306) for generating and outputting a sampling clock of the repetition frequency $f_1$ (Hz) independent of the optical signal bit rate $f_0$, a sampling and analog to digital converter (hereinafter referred to as ADC & sampler) 2308 for sampling an electrical signal output from the optical electrical converter 2304 by using a sampling clock of frequency $f_1$ (Hz) and outputting digital sampling data which are subjected to an analog to digital conversion, and an integrated circuit 2312 for subjecting the sampling data output from the ADC & sampler 2308 to the signal processing, thereby evaluating optical signal quality parameters.

An optical signal of the optical signal bit rate $f_0$ (bit/s) is converted to an electrical signal by the optical electrical converter 2304 and then input into the ADC & sampler 2308. Thereafter, the electrical signal is sampled and subjected to an analog to digital conversion by a clock of the repetition frequency $f_1$ (Hz) independent of the optical signal bit rate sent out from the local clock source 1 (2306) in the ADC & sampler 2308 for conversion to digital sampling data, and then input into the integrated circuit 2312. The sampling data are subjected to the electrical signal processing in the integrated circuit 2312 in which signal processing functions are programmed and used in evaluating optical signal quality parameters.

Prior to operation of an optical network, a Q value is measured in advance by using an optical signal with a known bit rate to obtain corrections of the optical signal quality parameters corresponding to all signal bit rates applicable in the optical network.

In operating the optical network, the integrated circuit 2312 determines the optical signal quality parameters while switching corrections for individual bit rates periodically and in turn. In this instance, an optical signal quality parameter will exhibit the highest value which is calculated by using a correction in conformity with the bit rate of the optical signal. Therefore, an evaluation is made by using only the optical signal quality parameter which has exhibited the highest value for each cycle when the correction is switched periodically and in turn.

The integrated circuit 2312 conducts the signal processing by using an algorithm given in any of FIG. 3, FIG. 6, FIG. 9, FIG. 12 or FIG. 13. Each algorithm has been explained in Embodiments 3 through 7. The integrated circuit 2312 of the optical signal quality monitoring circuit in FIG. 23 shows a case where the signal processing is conducted by using the algorithm shown in FIG. 3.

Embodiment 18

Figure 24:
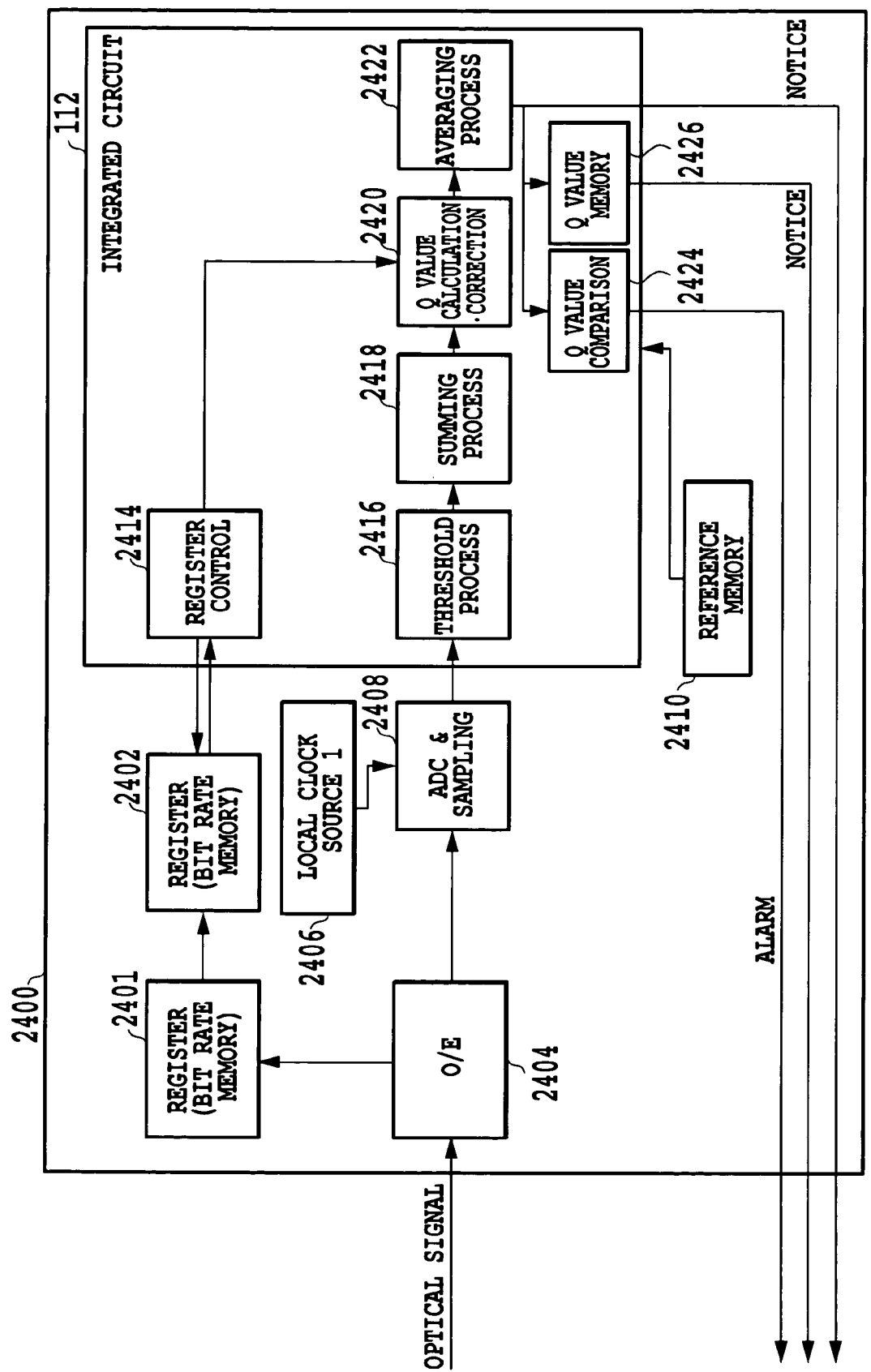
FIG. 24 is a block diagram showing another embodiment of the optical signal quality monitoring circuit in the present invention.

FIG. 24 is a block diagram showing another embodiment of the optical signal quality monitoring circuit in the present invention. The optical signal quality monitoring circuit 2400 is provided with an optical electrical converter (O/E) 2404 for subjecting an input optical signal of the optical signal bit rate $f_0$ (bit/s) to a photoelectric conversion to output an electrical signal, a local clock source 1 (2406) for generating and outputting a sampling clock of the repetition frequency $f_1$ (Hz) independent of the optical signal bit rate $f_0$, a sampling and analog to digital converter (hereinafter referred to as ADC & sampler) 2408 for sampling an electrical signal output from the optical electrical converter 2404 by using a sampling clock of frequency $f_1$ (Hz) and outputting digital sampling data which are subjected to an analog to digital conversion, an integrated circuit 2412 for subjecting the sampling data output from the ADC & sampler 2408 to the signal processing, thereby evaluating optical signal quality parameters, and a bit rate detector 2401 for detecting information on the optical signal bit rate $f_0$ by using the electrical signal output from the optical electrical converter 2404. The optical signal quality monitoring circuit 2400 may be further provided with a register 2402 for memorizing the information on the optical signal bit rate $f_0$ detected by the bit rate detector 2401.

An optical signal of the optical signal bit rate $f_0$ (bit/s) is converted to an electrical signal by the optical electrical converter 2404 and then input into the ADC & sampler 2408. Thereafter, the electrical signal is sampled and subjected to an analog to digital conversion by a clock of the repetition frequency $f_1$ (Hz) independent of the optical signal bit rate sent out from the local clock source 1 (2406) in the ADC & sampler 2408 for conversion to digital sampling data, and then input into the integrated circuit 2412. The sampling data are subjected to the electrical signal processing in the integrated circuit 2412 in which signal processing functions are programmed and used in evaluating optical signal quality parameters.

Where the signal bit rate is changed, the integrated circuit 2412 detects a change in the bit rate by the bit rate detector 2401 and calculates signal quality parameters by using corrections corresponding to the changed signal bit rate. For example, the integrated circuit 2412 is able to detect a change in the signal bit rate by reading out the information on the optical signal bit rate $f_0$ memorized in the register 2402 via the register control 2414 and also able to correct optical signal quality parameters by using corrections corresponding to the changed signal bit rate.

Figure 27:
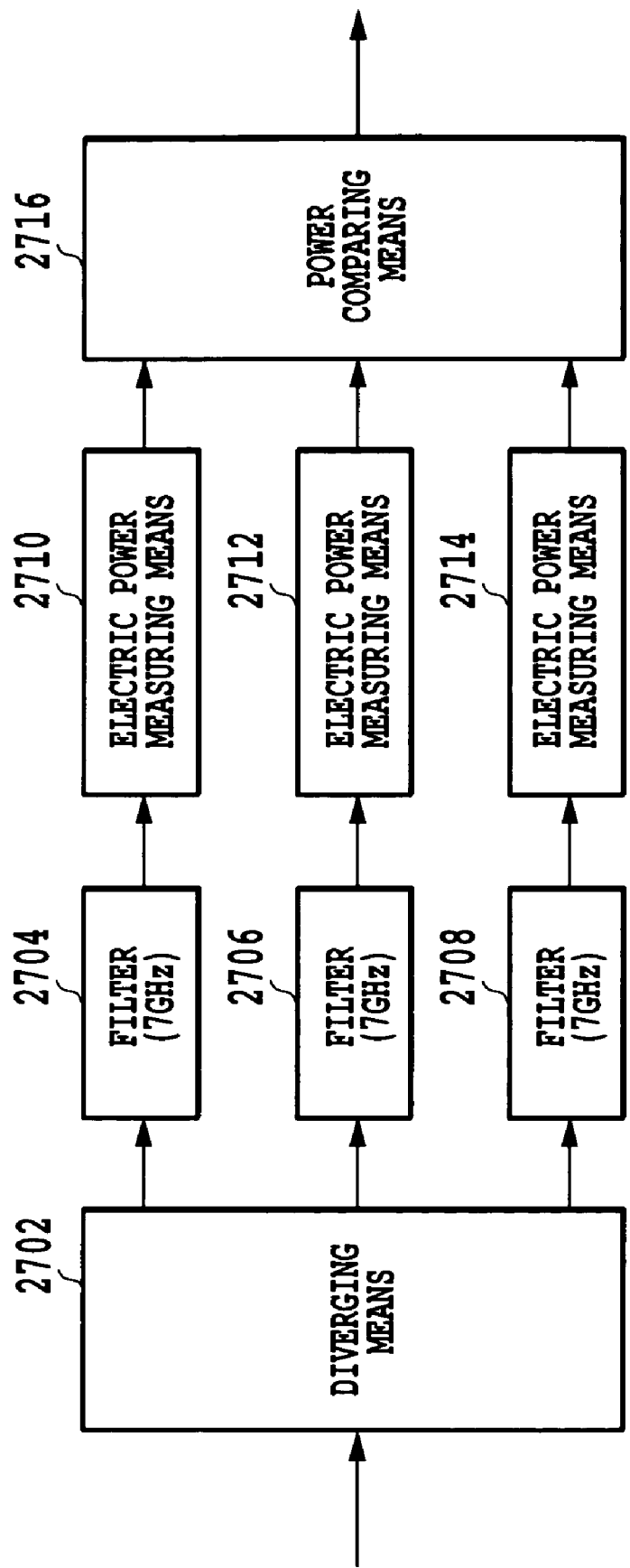
FIG. 27 is a block diagram showing an embodiment of the bit rate detection means of the optical signal quality monitoring circuit in the present invention.

To be more specific, the bit rate detection means 2401 includes a combination of diverging means 2702 shown in FIG. 27 with frequency filters 2704, 2706 and 2708, electric power measuring means 2710, 2712 and 2714 and power comparing means 2716. An optical signal of the bit rate $f_0$ (bit/s) is converted to an electrical signal by the photoelectric conversion and then input into low-frequency transmitting frequency filters 2704, 2706 and 2708 corresponding to a plurality of signal bit rates through the diverging means 2702. In the example shown in FIG. 27, used are frequency filters respectively transmitting not more than approximately 70% of frequencies (7 GHz, 1.8 GHz and 1 GHz) in relation to bit rates, 10 G bit/s, 2.5 G bit/s and 1.2 G bit/s. The electrical signal passed through individual frequency filters are input into the electric power measuring means 2710, 2712 and 2714. The outputs from these electric-power measuring means are led to the power comparing means 2716 for comparison. Then, information on the signal bit rate corresponding to the frequency filter which outputs the greatest electric power is regarded as a bit rate of the current optical signal and sent to the register 2414 of the integrated circuit 2412. Thereafter, signal quality parameters are corrected in response to the information on the signal bit rate given in the integrated circuit 2412.

In the integrated circuit 2412, the signal processing is conducted by using an algorithm given in any of FIG. 3, FIG. 6, FIG. 9, FIG. 12 or FIG. 13. Each algorithm has been explained in Embodiments 3 through 7. The integrated circuit 2412 of the optical signal quality monitoring circuit shown in FIG. 24 shows a case where the signal processing is conducted by using the algorithm shown in FIG. 3.

Embodiment 19

Figure 25:
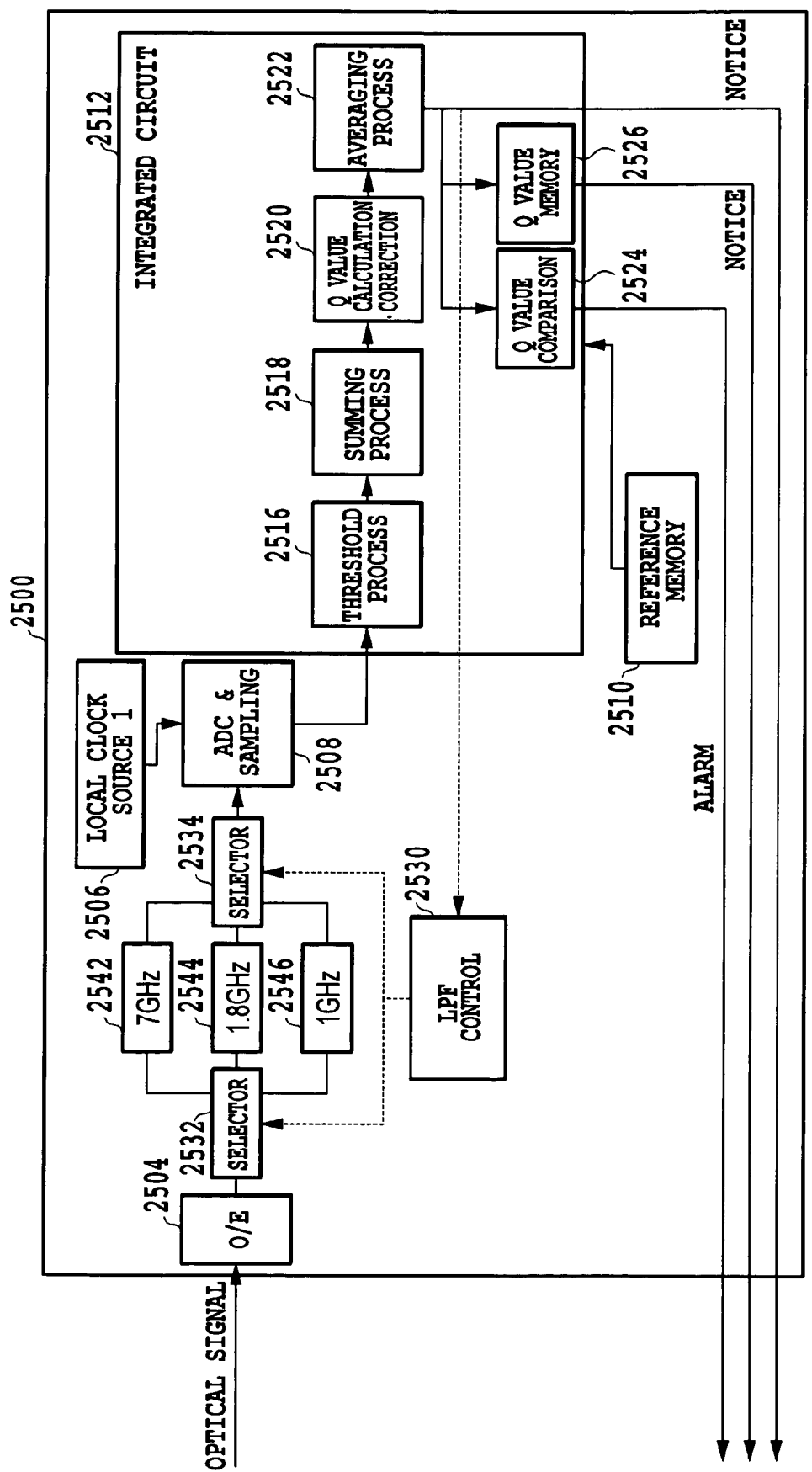
FIG. 25 is a block diagram showing another embodiment of the optical signal quality monitoring circuit in the present invention.

FIG. 25 is a block diagram showing another embodiment of the optical signal quality monitoring circuit in the present invention. The optical signal quality monitoring circuit 2500 is provided with an optical electrical converter (O/E) 2504 for subjecting an input optical signal of the optical signal bit rate $f_0$ (bit/s) to a photoelectric conversion to output an electrical signal, a local clock source 1 (2506) for generating and outputting a sampling clock of the repetition frequency $f_1$ (Hz) independent of the optical signal bit rate $f_0$, a plurality of frequency filters 2542, 2544 and 2546 corresponding to individually different signal bit rates $f_0$ (for example, 7 GHz, 1.8 GHz and 1 GHz), selectors 2532 and 2534 for switching a plurality of frequency filters, an ADC & sampler 2508 for sampling the electrical signal passed through the filter by using a sampling clock of the frequency $f_1$ (Hz) and outputting digital sampling data subjected to an analog to digital conversion, an integrated circuit 2512 for subjecting the sampling data output from the ADC & sampler 2508 to the signal processing, thereby evaluating optical signal quality parameters and an LPF control part 2530 for receiving a filter-switching signal from the integrated circuit 2512 to control the selectors.

An optical signal of the optical signal bit rate $f_0$ (bit/s) is converted to an electrical signal by the optical electrical converter 2504 and then input into any of a plurality of frequency detectors 2542, 2544 and 2546 corresponding to different optical signal bit rates $f_0$ switched by selectors 2532 and 2534. An electrical signal passed through the filter is converted to sampling data by the ADC & sampler 2508 similarly as described in Embodiment 17 and then used in evaluating optical signal quality parameters in the integrated circuit 2512.

In evaluating the optical signal quality parameters, the selectors 2532 and 2534 are used to switch a plurality of frequency filters periodically and in turn, thereby obtaining the optical signal quality parameters. In this instance, the optical signal quality parameters will exhibit the greatest value, which are in conformity with the bit rate of the optical signal and obtained by using the frequency filter. Therefore, an evaluation is made by using only the optical signal quality parameters which have exhibited the highest value for each cycle when the frequency filter is switched periodically and in turn.

In the integrated circuit 2512, the signal processing is conducted by using an algorithm given in any of FIG. 3, FIG. 6, FIG. 9, FIG. 12 or FIG. 13. Each algorithm has been explained in Embodiments 3 through 7. The integrated circuit 2512 of the optical signal quality monitoring circuit in FIG. 25 shows a case where the signal processing is conducted by using the algorithm shown in FIG. 3.

Embodiment 20

Figure 26:
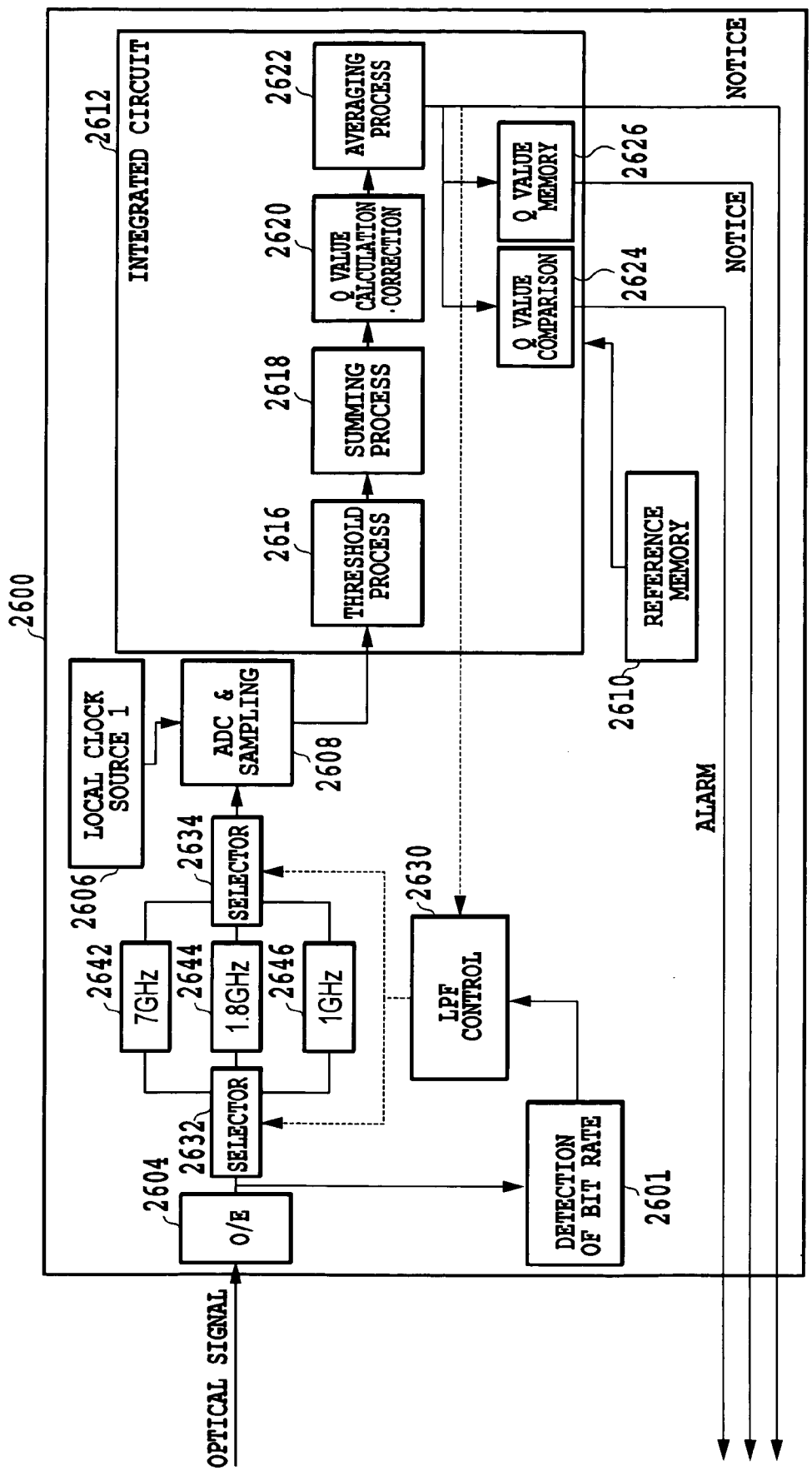
FIG. 26 is a block diagram showing another embodiment of the optical signal quality monitoring circuit in the present invention.

FIG. 26 is a block diagram showing another embodiment of the optical signal quality monitoring circuit in the present invention. The optical signal quality monitoring circuit 2600 is provided with an optical electrical converter (O/E) 2604 for subjecting an input optical signal of the optical signal bit rate $f_0$ (bit/s) to a photoelectric conversion to output an electrical signal, a local clock source 1 (2606) for generating and outputting a sampling clock of the repetition frequency $f_1$ (Hz) independent of the optical signal bit rate $f_0$, a plurality of frequency filters 2642, 2644 and 2646 corresponding to individually different signal bit rates $f_0$ (for example, 7 GHz, 1.8 GHz and 1 GHz), selectors 2632 and 2634 for switching a plurality of frequency filters, an ADC & sampler 2608 for sampling the electrical signal passed through the filter by using a sampling clock of the frequency $f_1$ (Hz) and outputting digital sampling data subjected to an analog to digital conversion, an integrated circuit 2612 for subjecting the sampling data output from the ADC & sampler 2608 to the signal processing, thereby evaluating optical signal quality parameters, a bit rate detector 2601 for outputting information on the optical signal bit rate $f_0$ by using the electrical signal output from the optical electrical converter 2604 and an LPF control part 2630 for controlling the selector according to the information on the optical signal bit rate $f_0$ given from the bit rate detector 2601.

An optical signal of the optical signal bit rate $f_0$ (bit/s) is converted to an electrical signal by the optical electrical converter 2604 and then input into any of the a plurality of frequency filters 2642, 2644 and 2646 corresponding to different optical signal bit rates $f_0$ switched by the selectors 2632 and 2634. An electrical signal passed through the filter is converted to sampling data by the ADC & sampler 2608 similarly as described in Embodiment 17 and then used in evaluating the optical signal quality parameters in the integrated circuit 2612.

Where the signal bit rate is changed, the LPF control part 2630 detects a change in the bit rate by the information on the optical signal bit rate $f_0$ output from the bit rate detector 2601, and switches to a frequency filter suitable to the changed signal bit rate by the selectors 2632 and 2634. Therefore, the integrated circuit 2612 is able to determine signal quality parameters in response to a change in the signal bit rate.

To be more specific, the bit rate detection means includes a combination of the diverging means 2702 shown in FIG. 27 with frequency filters 2704, 2706 and 2708, electric power measuring means 2710, 2712 and 2714 and power comparing means 2716, as with Embodiment 18. Then, information on the signal bit rate corresponding to the frequency filter which outputs the greatest electric power is regarded as a bit rate of the current optical signal and sent to the LPF control part 2630. Thereafter, the selectors 2632 and 2634 are used to switch to a frequency filter corresponding to the signal bit rate for measuring signal quality parameters.

In the integrated circuit 2612, the signal processing is conducted by using an algorithm given in any of FIG. 3, FIG. 6, FIG. 9, FIG. 12 or FIG. 13. Each algorithm has been explained in Embodiments 3 through 7. The integrated circuit 2612 of the optical signal quality monitoring circuit in FIG. 26 shows a case where the signal processing is conducted by using the algorithm shown in FIG. 3.

The invention claimed is:

1. An optical signal quality monitoring circuit comprising:
   photoelectric conversion means for converting an input optical signal to an electrical signal;
   sampling means for sampling and converting the electrical signal with any given repetition frequency $f_1$ to digital sampling data by an analog to digital conversion; and
   signal processing means for correcting and evaluating an averaged Q value based on correction factors obtained in advance according to a change in the signal bit rate of the optical signal, wherein the signal processing means:
   calculates, by using the sampling data, averages $\mu_0$ and $\mu_1$ and standard deviations $\sigma_0$ and $\sigma_1$ for two distributions of signal amplitude values that are mark part and space part, and
   calculates the averaged Q value as an optical quality parameter of the optical signal using the calculated averages $\mu_0$ and $\mu_1$ and standard deviations $\sigma_0$ and $\sigma_1$.

2. The optical signal quality monitoring circuit according to claim 1, further comprising:
   signal bit rate information receiving means for receiving signal bit rate information of the optical signal, wherein the signal processing means corrects the optical signal quality parameter of the optical signal on the basis of the received signal bit rate information.

3. The optical signal quality monitoring circuit according to claim 1, further comprising:
   control signal receiving means for receiving a control signal demanding the switchover of a signal bit rate of the optical signal;
   a plurality of frequency filters corresponding to individually different signal bit rates; and
   a selector for changing a plurality of the frequency filters, wherein
   in response to receipt of the control signal, the signal processing means switches the selectors to measure the optical signal quality parameter of the optical signal, while sequentially changing frequency filters through which the electrical signal passes, and fixes the selector so that the electrical signal can pass through the frequency filters in which the optical signal quality parameter is maximized after the electrical signal has passed through all the frequency filters, and evaluates the optical signal quality parameter of the optical signal.

4. The optical signal quality monitoring circuit according to claim 1, wherein the signal processing means periodically changes a correction value of optical signal quality parameter corresponding to individually different signal bit rates and evaluates the optical signal quality parameters of the optical signal.

5. The optical signal quality monitoring circuit according to claim 1, further comprising:
   bit rate detection means for detecting a signal bit rate of the optical signal by using the electrical signal, wherein
   the signal processing means corrects the optical signal quality parameter of the optical signal on the basis of the detected signal bit rate.

6. The optical signal quality monitoring circuit according to claim 1, further comprising:
   a plurality of frequency filters corresponding to individually different signal bit rates; and
   a selector for changing a plurality of the frequency filters, wherein
   the signal processing means periodically switches the selectors to measure the optical signal quality parameter of the optical signal, while sequentially changing frequency filters through which the electrical signal passes and evaluates the optical signal quality parameter of the optical signal in which the optical signal quality parameters are maximized for each cycle.

7. The optical signal quality monitoring circuit according to claim 1, further comprising:
   bit rate detection means for detecting the signal bit rate of the optical signal by using the electrical signal;
   a plurality of frequency filters corresponding to individually different signal bit rates and a selector for changing a plurality of the frequency filters, wherein
   the signal processing means switches the selectors so that the electrical signal can pass through the frequency filters corresponding to the signal bit rates and evaluates the optical signal quality parameter of the optical signal.

8. The optical signal quality monitoring circuit according to claim 1, wherein the photoelectric conversion means is provided with an optical electrical converter which converts the optical signal of repetition frequency $f_0$ to an electrical signal.

9. The optical signal quality monitoring circuit according to claim 1, wherein the photoelectric conversion means comprises:
   an optical electrical sampling circuit which samples an optical signal of bit rate $f_0$ by using an electrical pulse synchronized with a clock of repetition frequency $f_1$ to output a sampling optical signal; and
   an optical electrical converter for converting the sampling optical signal to an electrical signal.

10. The optical signal quality monitoring circuit according to claim 1, wherein the photoelectric conversion means comprises:
    an optical-optical sampling circuit which samples an optical signal of bit rate $f_0$ by using an optical pulse synchronized with a clock of repetition frequency $f_1$ to output the sampling optical signal; and
    an optical electrical converter for converting the sampling optical signal to an electrical signal.

11. The optical signal quality monitoring circuit according to claim 1, wherein the signal processing means comprises:
    threshold processing means which compares a signal amplitude of the sampling data with a predetermined threshold to classify the sampling data into two distributions, namely, a mark part and a space part of the binary signal;
    summing processing means for calculating a sum of signal amplitude values of the sampling data and a sum of squares of the signal amplitude values for the two distributions;
    Q value calculation processing means in which a standard deviation and an average value are determined from a sum of signal amplitude values of the sampling data and a sum of squares of the amplitude values for the respective two distributions and a Q value is calculated by referring to the standard deviation and the average value of distribution of the mark part as well as the standard deviation and the average value of distribution of the space part;
    Q value correction and processing means for correcting the Q value according to the signal bit rate of the optical signal;
    averaging processing means for measuring the corrected Q value multiple times and averaging the corrected Q value;
    Q value memory means for memorizing the Q value corrected and averaged; and
    alarm transfer processing means for transferring an alarm when the corrected and averaged Q value is lower than a reference Q value.

12. The optical signal quality monitoring circuit according to claim 1, wherein the signal processing means comprises:
    first threshold processing means which compares the signal amplitude of the sampling data with a first predetermined threshold to classify the sampling data into two distributions, namely, a mark part and a space part of the binary signal;
    summing processing means for calculating a sum of signal amplitude values of the sampling data for the respective two distributions:
        average value calculation processing means for measuring the average value from a sum of signal amplitude values of the sampling data calculated for the respective two distributions;
        second threshold processing means in which the average values determined respectively for the two distributions are respectively regarded as second and third thresholds to classify the sampling data into a distribution of a second mark part consisting of a distribution greater in signal amplitude than the second threshold and a distribution line-symmetrical to the second threshold when the signal amplitude of the sampling data is greater than the second threshold and classify the sampling data into a distribution of the second space part consisting of a distribution smaller in signal amplitude than the third threshold and a distribution line-symmetrical to the third threshold when the signal amplitude of the sampling data is smaller than the third threshold;
    second summing processing means for calculating a sum of squares of the signal amplitude of the sampling data for the respective two distributions of the second mark part and second space part;
    Q value calculation processing means in which a standard deviation is determined by using a sum of the signal amplitude values and a sum of squares of the signal amplitude for the respective two distributions of the second mark part and second space part and a Q value is calculated by using the respective average values of the mark part and the space part as well as the respective standard deviations of the second mark part and the second space part;

averaging processing means for measuring the corrected Q values multiple times and averaging the corrected Q values after the Q value is corrected according to the signal bit rates of the optical signal;

Q value memory means for memorizing the corrected and averaged Q value; and alarm transfer means for transferring an alarm when the corrected and averaged Q value is lower than a reference Q value which is previously memorized.

13. The optical signal quality monitoring circuit according to claim 1, wherein the signal processing means comprises:

histogram processing means in which the signal amplitude of the sampling data is classified for every quantization value and a histogram is obtained by summing the frequency;

first threshold processing means for comparing the signal amplitude of the sampling data with a predetermined first threshold to classify the sampling data into two distributions, namely;

a mark part and a space part of the binary signal;

peak detection processing means in which a frequency peak is detected respectively for the two distributions of the mark part and the space part and a signal amplitude of the sampling data showing the peak frequency is set to an average value;

second threshold processing means in which the average values determined respectively for the two distributions are respectively regarded as second and third thresholds to classify the sampling data into a distribution of the second mark part consisting of the distribution greater in signal amplitude than the second threshold and the distribution line-symmetrical to the second threshold when the signal amplitude of the sampling data is greater than the second threshold and classify the sampling data into a distribution of the second space part consisting of the distribution smaller in signal amplitude than the third threshold and the distribution line-symmetrical to the third threshold when the signal amplitude of the sampling data is smaller than the third threshold;

second summing processing means for calculating a sum of squares of the signal amplitude of the sampling data for the respective two distributions of the second mark part and second space part;

Q value calculation processing means in which a standard deviation is determined by using a sum of the signal amplitude values and a sum of squares of the signal amplitude for the respective two distributions of the second mark part and second space part and a Q value is calculated by using the respective average values of the mark part and the space part as well as the respective standard deviations of the second mark part and the second space part;

Q value correction processing means for correcting the Q value according to the signal bit rate of the optical signal;

averaging processing means for measuring the corrected Q values multiple times and averaging the corrected Q values;

Q value memory means for memorizing the corrected and averaged Q value; and alarm transfer means for transferring an alarm when the corrected and averaged Q value is lower than a reference Q value which is previously memorized.

14. The optical signal quality monitoring circuit according to claim 1, wherein the repetition frequency $f_1$ satisfies the formula of $f_1=(n/m)f_0 \pm a$ and $(n/m)^2/\{k+(n/m)\}f_0 \leq a < (n/m)^2/\{k+(n/m)-1\}f_0$ (n, m, and k are natural numbers), and the signal processing means comprises:

the processing means for detecting a preponderant portion of an eye opening of the eye pattern obtained by overwriting digital data for every k unit;

Q value calculation processing means in which a frequency peak is detected for the respective distributions of the mark part and the space part around said part which is a maximum of the eye opening to determine the average value and the standard deviation from which the Q value is calculated;

Q value correction processing means for correcting the Q value according to the signal bit rate of the optical signal;

averaging processing means for measuring the corrected Q values multiple times and averaging the corrected Q values;

Q value memory means for memorizing the corrected and averaged Q value; and alarm transfer means for transferring an alarm when the corrected and averaged Q value is lower than a reference Q value which is previously memorized.

15. An optical signal quality monitoring method comprising:

a step of converting an input optical signal to an electrical signal;

a step of sampling the electrical signal with any given repetition frequency $f_1$ and converting the electrical signal into digital sampling data through an analog to digital conversion;

a step of calculating, by using the sampling data, averages $\mu_0$ and $\mu_1$ standard deviations $\sigma_0$ and $\sigma_1$ for two distributions of signal amplitude values that are mark part and space part, and calculating the averaged Q value as an optical quality parameter of the optical signal using the calculated averages $\mu_0$ and $\mu_1$ and standard deviations $\sigma_0$ and $\sigma_1$; and a step of correcting and evaluating the averaged Q value as the optical signal quality parameter of the optical signal based on correction factors obtained in advance according to changes in signal bit rate of the optical signal.

16. The optical signal quality monitoring method according to claim 15, wherein the step of evaluating optical signal quality parameters of the optical signal comprises:

a step which compares the signal amplitude of the sampling data with a predetermined threshold to classify the sampling data into two distributions, namely, a mark part and a space part of the binary signal;

a step of calculating a sum of signal amplitude values of the sampling data and a sum of squares of the signal amplitude value respectively for the two distributions;

a step in which a standard deviation and an average value are determined from a sum of signal amplitude values of the sampling data and a sum of squares of the amplitude value for the respective two distributions, and a Q value is calculated by using the standard deviation and the average value of the distribution of the mark part as well as the standard deviation and the average value of the distribution of the space part;

a step of correcting the Q value according to the signal bit rate of the optical signal;

a step of measuring the corrected Q value multiple times and averaging the corrected Q value;

a step of comparing the corrected and averaged Q value with a reference Q value which is previously memorized; and a step of transferring an alarm when the corrected and averaged Q value is lower than a reference Q value which is previously memorized.

17. The optical signal quality monitoring method according to claim 15, wherein the step of evaluating optical signal quality parameters of the optical signal comprises:

a step which compares the signal amplitude of the sampling data with a predetermined first threshold to classify the sampling data into two distributions, namely, a mark part and a space part of the binary signal;

a step of calculating a sum of signal amplitude values of the sampling data for the respective two distributions;

a step of calculating an average value from a sum of signal amplitude values of the sampling data calculated for the respective two distributions;

a step in which the average values determined respectively for the two distributions are respectively regarded as second and third thresholds to classify the sampling data into a distribution of the second mark part consisting of the distribution greater in signal amplitude than the second threshold and the distribution line-symmetrical to the second threshold when the signal amplitude of the sampling data is greater than the second threshold and classify the sampling data into a distribution of the second space part consisting of the distribution smaller in signal amplitude than the third threshold and the distribution line-symmetrical to the third threshold when the signal amplitude of the sampling data is smaller than the third threshold;

a step of calculating a sum of squares of the signal amplitude of the sampling data respectively for the two distributions of the second mark part and second space part;

a step in which a standard deviation is determined from a sum of the signal amplitude values and a sum of squares of the signal amplitude for the respective two distributions of the second mark part and second space part, and a Q value is calculated by using the respective average values of the mark part and the space part as well as the respective standard deviations of the second mark part and the second space part;

a step of measuring the corrected Q values multiple times and averaging the corrected Q values after the Q value is corrected according to the signal bit rate of the optical signal;

a step of memorizing the corrected and averaged Q value; and a step of transferring an alarm when the corrected and averaged Q value is lower than a reference Q value which is previously memorized.

18. The optical signal quality monitoring method according to claim 15, wherein the step of evaluating optical signal quality parameters of the optical signal comprises:

a step in which the signal amplitude of the sampling data is classified for every quantization value and a histogram is obtained by summing the frequency;

a step of comparing the signal amplitude of the sampling data with a predetermined first threshold to classify the sampling data into two distributions, namely, a mark part and a space part of the binary signal;

a step in which a frequency peak is detected respectively for the two distributions of the mark part and the space part and a signal amplitude of the sampling data showing the peak frequency is set as an average value;

a step in which the average values determined respectively for the two distributions are regarded as second and third thresholds to classify the sampling data into a distribution of the second mark part consisting of the distribution greater in signal amplitude than the second threshold and the distribution line-symmetrical to the second threshold when the signal amplitude of the sampling data is greater than the second threshold and classify the sampling data into a distribution of the second space part consisting of the distribution smaller in signal amplitude than the third threshold and the distribution line-symmetrical to the third threshold when the signal amplitude of the sampling data is smaller than the third threshold;

a step of calculating a sum of squares of the signal amplitude of the sampling data for the respective two distributions of the second mark part and second space part;

a step in which a standard deviation is determined by using a sum of the signal amplitude values and a sum of squares of the signal amplitude for the respective two distributions of the second mark part and second space part and a Q value is calculated by using the respective average values of the mark part and the space part as well as the respective standard deviations of the second mark part and the second space part;

a step of correcting the Q value according to the signal bit rate of the optical signal;

a step of measuring the corrected Q values multiple times and averaging the corrected Q values;

a step of memorizing the corrected and averaged Q value; and a step of transferring an alarm when the corrected and averaged Q value is lower than a reference Q value which is previously memorized.

19. The optical signal quality monitoring method according to claim 15, wherein the step of conversion to digital sampling data through analog to digital conversion samples the electrical signal by a repetition frequency f1 which satisfies $f_1 = (n/m)f_0 \pm a$ and $(n/m)^2/\{k+(n/m)\}f_0 \leq a < (n/m)^2/\{k+(n/m)-1\}f_0$ (n, m and k are natural numbers), and the step of evaluating optical signal quality parameters of the optical signal comprises:

a step of detecting a preponderant portion of an eye opening of the eye pattern obtained by overwriting digital data for every k unit;

a step in which a frequency peak is detected for the respective distributions of the mark part and the space part around said part which is a maximum of the eye opening to determine the average value and the standard deviation, from which the Q value is calculated;

a step of correcting the Q value according to the signal bit rate of the optical signal;

a step of measuring the corrected Q values multiple times and averaging the corrected Q values;

a step of memorizing the corrected and averaged Q value; and a step of transferring an alarm when the corrected and averaged Q value is lower than a reference Q value which is previously memorized.

20. An optical signal quality monitoring circuit, comprising:

photoelectric conversion means for converting an input optical signal to an electrical signal;

sampling means for sampling and converting the electrical signal with any given repetition frequency $f_1$ to digital sampling data by an analog to digital conversion;

signal processing means for correcting and evaluating an optical signal quality parameter of the optical signal according to a change in the signal bit rate of the optical signal by using the sampling data;

a plurality of frequency filters corresponding to individually different signal bit rates; and a selector for changing a plurality of the frequency filters, wherein the signal processing means periodically switches the selectors to measure the optical signal quality parameter of the optical signal, while sequentially changing frequency filters through which the electrical signal passes and evaluates the optical signal quality parameter of the optical signal in which the optical signal quality parameters are maximized for each cycle.

* * * * *